(12) United States Patent
Markham

(10) Patent No.: US 12,402,600 B2
(45) Date of Patent: *Sep. 2, 2025

(54) PET GROOMING DEVICE

(71) Applicant: Bounce Enterprises LLC, Golden, CO (US)

(72) Inventor: Joseph P. Markham, Golden, CO (US)

(73) Assignee: Bounce Enterprises LLC, Golden, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/349,038

(22) Filed: Jul. 7, 2023

(65) Prior Publication Data

US 2023/0345909 A1 Nov. 2, 2023

Related U.S. Application Data

(63) Continuation-in-part of application No. 17/521,467, filed on Nov. 8, 2021, now Pat. No. 11,712,023.

(51) Int. Cl.
*A01K 13/00* (2006.01)

(52) U.S. Cl.
CPC .................................. *A01K 13/002* (2013.01)

(58) Field of Classification Search
CPC ......... A01K 13/002; A01D 7/08; A47L 13/02; A47L 13/022; A47L 13/08; A46B 5/0095; A46B 7/004; A46B 7/042; A46B 7/044; A01G 20/40; A01G 20/43
USPC .................. 119/625, 627, 631; 15/236.08, 1, 15/236.05–236.9
See application file for complete search history.

(56) References Cited

U.S. PATENT DOCUMENTS

| 128,632 | A | * | 7/1872 | Kellogg | A01K 13/002 |
| | | | | | 119/611 |
| RE7,822 | E | * | 7/1877 | Sweet | 119/631 |
| 194,820 | A | * | 9/1877 | Holmes | A01K 13/002 |
| | | | | | 119/631 |
| 277,173 | A | * | 5/1883 | Thompson | A01K 13/002 |
| | | | | | 15/237 |

(Continued)

FOREIGN PATENT DOCUMENTS

| DE | 20014573 U1 * | 11/2000 | A01D 7/08 |
| FR | 3024642 A1 * | 2/2016 | A01K 13/00 |

OTHER PUBLICATIONS

Merged translation of DE_20014573 (Year: 2000).*

(Continued)

*Primary Examiner* — Morgan T Jordan
(74) *Attorney, Agent, or Firm* — Berg Hill Greenleaf Ruscitti LLP

(57) ABSTRACT

A grooming device includes a plurality of flexible tines, each having a grooming element mounted to the distal end thereof. The tines are spaced from one another laterally and spaced at different elevations as viewed from the side. The tines may be of uniform shape and lengths or different shapes and lengths. The grooming elements can be integrally molded with the tines or the tines may be blades that are made from a different material. The blades may be permanently secured to the tines or can be removable for replacement by a user. The blades may have a planar body with a contact edge. The proximal ends of the tines are secured to a handle which is grasped by the user. The tines can be curved in shape or can be hooked shaped.

13 Claims, 27 Drawing Sheets

(56) References Cited

U.S. PATENT DOCUMENTS

| | | | | |
|---|---|---|---|---|
| 336,490 A * | 2/1886 | Norton | A01K 13/00 | |
| | | | 15/245 | |
| 342,512 A * | 5/1886 | Higley | A01K 13/002 | |
| | | | 15/236.08 | |
| 440,022 A * | 11/1890 | Du Shane | A01K 13/002 | |
| | | | 119/631 | |
| 460,091 A * | 9/1891 | Goodrich | A01K 13/002 | |
| | | | 119/631 | |
| 532,564 A * | 1/1895 | Kelley | A01K 13/002 | |
| | | | 15/236.08 | |
| 545,999 A * | 9/1895 | Bacon et al. | A01K 13/002 | |
| | | | 119/611 | |
| 575,544 A * | 1/1897 | Decker | A01K 13/002 | |
| | | | 119/613 | |
| 832,864 A * | 10/1906 | Lockwood | A01K 13/002 | |
| | | | 119/632 | |
| 897,882 A * | 9/1908 | Desmond | A01K 13/002 | |
| | | | 119/628 | |
| 1,008,382 A * | 11/1911 | Sourek | A46B 9/06 | |
| | | | 15/236.08 | |
| 1,302,755 A * | 5/1919 | Ayer | A01K 13/002 | |
| | | | 119/627 | |
| 1,435,061 A * | 11/1922 | Halsey | F25C 5/043 | |
| | | | 15/236.08 | |
| 2,193,070 A * | 3/1940 | Lambert | A01G 20/40 | |
| | | | 56/400.17 | |
| 2,238,603 A * | 4/1941 | Runnels | A46B 7/044 | |
| | | | 132/142 | |
| 2,280,778 A * | 4/1942 | Andersen | A01B 1/227 | |
| | | | 15/236.08 | |
| 2,529,012 A * | 11/1950 | Gleekman | A01K 13/002 | |
| | | | 15/236.08 | |
| 2,622,387 A * | 12/1952 | Brooke | A01D 7/08 | |
| | | | 56/400.17 | |
| 2,721,439 A * | 10/1955 | Chrunka | A01G 20/40 | |
| | | | 56/400.17 | |
| 2,800,879 A * | 7/1957 | Quick | A01K 13/002 | |
| | | | 119/633 | |
| 2,954,832 A * | 10/1960 | Pirone | A41D 19/01594 | |
| | | | 172/370 | |
| 2,961,997 A * | 11/1960 | Oliver | A01K 13/002 | |
| | | | 119/632 | |
| 3,160,142 A * | 12/1964 | Torow | A01K 13/002 | |
| | | | 119/623 | |
| 3,164,945 A * | 1/1965 | Spencer | A01D 7/10 | |
| | | | 294/50.8 | |
| 3,530,524 A * | 9/1970 | Clemans | B44D 3/162 | |
| | | | 15/236.08 | |
| 3,669,130 A * | 6/1972 | Petroczky | A45D 24/02 | |
| | | | 132/138 | |
| 3,800,354 A * | 4/1974 | Stephens | A47L 17/06 | |
| | | | 15/104.04 | |
| D234,183 S * | 1/1975 | Malnar | D32/49 | |
| 4,046,109 A * | 9/1977 | Miller | A01K 13/002 | |
| | | | 30/304 | |
| 4,146,943 A * | 4/1979 | Wertheimer | A47L 13/08 | |
| | | | 15/236.08 | |
| 4,481,689 A | 11/1984 | Westmoreland | | |
| 4,715,632 A | 12/1987 | McVey | | |
| 4,741,149 A | 5/1988 | vom Braucke | | |
| 5,007,129 A | 4/1991 | Hainey | | |
| 5,045,091 A | 9/1991 | Abrahamson | | |
| 6,082,307 A | 7/2000 | Landreneau | | |
| 6,230,659 B1 | 5/2001 | Karlsson | | |
| 6,367,422 B1 * | 4/2002 | Wilhelmi | A01K 13/002 | |
| | | | 119/633 | |
| 6,427,633 B1 * | 8/2002 | Ogden | A01K 13/002 | |
| | | | 119/600 | |
| 6,676,181 B1 | 1/2004 | Greiner | | |
| D614,818 S | 4/2010 | Moore et al. | | |
| 9,301,500 B1 | 4/2016 | Murphy | | |
| 9,474,250 B1 | 10/2016 | Tipton | | |
| 11,490,594 B2 | 11/2022 | Porter | | |
| 2002/0078971 A1 | 6/2002 | Anderson | | |
| 2002/0189049 A1 | 12/2002 | Freidell | | |
| 2004/0212207 A1 * | 10/2004 | Franczyk | A21C 15/002 | |
| | | | 294/132 | |
| 2007/0193529 A1 | 8/2007 | Vandervoet | | |
| 2007/0209671 A1 | 9/2007 | Hase | | |
| 2011/0180013 A1 | 7/2011 | Kissel, Jr. | | |
| 2012/0055415 A1 * | 3/2012 | Whitman | A01K 13/002 | |
| | | | 119/633 | |
| 2012/0304938 A1 | 12/2012 | Wang | | |
| 2013/0125829 A1 | 5/2013 | Wang | | |
| 2013/0324802 A1 | 12/2013 | Makosky | | |
| 2014/0026821 A1 | 1/2014 | Tu | | |
| 2014/0026822 A1 | 1/2014 | Harris, II | | |
| 2014/0238310 A1 | 8/2014 | Holt, Jr. | | |
| 2015/0107528 A1 | 4/2015 | Moeller | | |
| 2017/0099806 A1 | 4/2017 | Kramer | | |
| 2017/0215379 A1 | 8/2017 | Hadden | | |
| 2017/0332775 A1 | 11/2017 | Anthony | | |
| 2018/0020612 A1 | 1/2018 | Alexander | | |
| 2018/0064065 A1 * | 3/2018 | Wang | B25G 3/26 | |
| 2020/0046108 A1 | 2/2020 | Bellah | | |
| 2021/0105936 A1 | 4/2021 | Serlachius | | |
| 2021/0330066 A1 | 10/2021 | Ross | | |
| 2023/0141744 A1 | 5/2023 | Markham | | |

OTHER PUBLICATIONS

Merged translation of FR_3024642 (Year: 2016).*
International Preliminary Report on Patentability in International application No. PCT/US22/79436 on May 16, 2024, 10 pages.
International Search Report and Written Opinion in International Application No. PCT/US22/79436, mailed Jan. 27, 2023, 15 pages.
International Search Report and Written Opinion in International application No. PCT/US2024/037044 on Dec. 16, 2024, 18 pages.

* cited by examiner

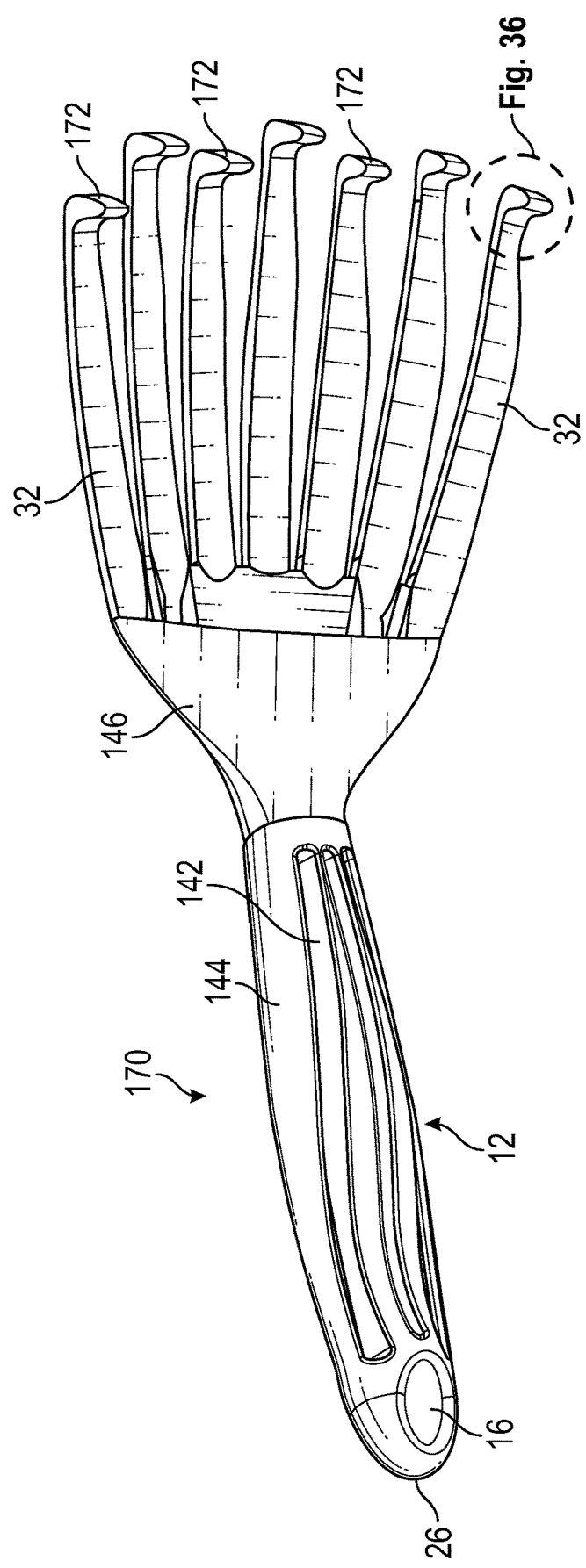
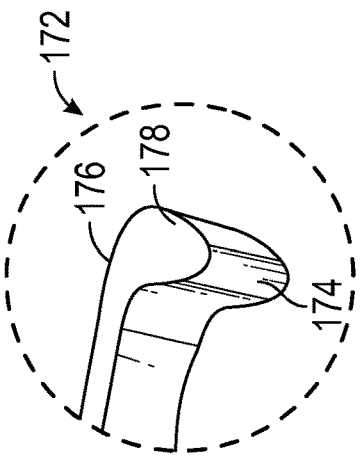
FIG. 35
FIG. 36

PET GROOMING DEVICE

CROSS REFERENCE TO RELATED APPLICATION

This application is a continuation in part of U.S. patent application Ser. No. 17/521,467 filed Nov. 8, 2021; the entirety of this related application being incorporated herein by reference.

FIELD OF THE INVENTION

The invention generally relates to combs or brushes for animals, and more particularly, to a pet or animal grooming device that has replaceable grooming elements that can be selected for the particular type of animal being groomed and the grooming task to be achieved.

BACKGROUND OF THE INVENTION

Brushes or combs for animals are known in a multitude of different configurations. A standard comb has a shaft or body and a plurality of teeth that extend linearly along the length of the body. Further, a standard comb typically has teeth that are of the same size, shape and spacing from one another. A standard brush includes a plurality of bristles made of a flexible material and mounted to a body of the brush. The standard brush may have handles of different configurations.

Common functionality for both standard combs and brushes is that the force capable of being transferred to the hair or fur of an animal primarily depends upon two factors: the stiffness of the teeth or bristles and the amount of force applied by the user to the brush. Accordingly, variability in how the hair or fur of an animal is manipulated is somewhat limited in that the uniform flexibility or stiffness of the teeth and bristles becomes a primary factor as to how the animal's hair is groomed.

In order to vary the type of grooming an animal is to receive, a groomer may have a number of different brushes and combs to address the varying types of animal hair encountered for pets. For example, some dog breeds have short hair of uniform length and texture, while other dog breeds may have longer hair and two coats with differing textures and lengths. Further for example, some dogs have an undercoat of soft fine fur and an overcoat of longer, stiffer fur. As one can appreciate, having the capability to address grooming requirements for the multitude of different types of animal coats can require a relatively large number of grooming utensils.

One particularly difficult grooming task is the grooming of an undercoat for an animal in which it is necessary to penetrate the outer or overcoat layer of hair without destroying the overcoat in the process of grooming the undercoat.

As set forth herein, the grooming device of the present invention provides many advantages over existing grooming devices, as one will appreciate from a review of the following description of the invention and accompanying drawings.

SUMMARY OF THE INVENTION

The invention herein provides a grooming device that is especially adapted for grooming the fur of animals including pets such as dogs and cats. According to one preferred embodiment, the grooming device comprises a plurality of flexible tines or support extensions, each having a grooming element mounted to the distal ends thereof.

The tines are spaced from one another laterally and may have the same or differing lengths. For differing lengths, this arrangement provides a staggered presentation of grooming elements for contact with the animal to be groomed. The tines may be of uniform shape and spaced substantially equidistant from one another. Alternatively, the tines can be of different shapes and lengths, thereby providing enhanced controlled flexibility for each tine.

The grooming elements are provided in a number of different arrangements in which the side of the grooming elements which contact the fur of the animal have a contact edge that may contain specially configured teeth, or the contact edge may have a pointed or tapered configuration, as discussed in further detail below. The grooming elements may also be described as blades that have a planar body with a contact edge comprising a plurality of teeth or other features which enable grooming of an animal.

With respect to the grooming elements that have a plurality of teeth, these may be configured in a number of different arrangements to provide the desired type of grooming action to be undertaken. For example, according to one configuration, the teeth may be pointed or rectangular shaped. Further for example, the teeth may incorporate teeth similar to teeth that are used on a hacksaw blade; such teeth may be aligned parallel with the contact edge of the grooming element or the teeth may be provided in an offset arrangement with the contact edge. Another configuration of the teeth are provided in a V-shaped orientation.

The proximal ends of the tines are secured to a handle which is grasped by the user. The handle may be ergonomically configured to fit comfortably in the user's hand. Specifically, the handle may have a plurality of indentations or grooves that enable the user's fingers to be comfortably placed in the indentations/grooves to enhance gripping of the handle and to enhance comfort for the user's hand.

According to one specific embodiment of the device, the tines are spaced laterally and equidistant from one another. The orientation of the grooming elements is provided in a desired degree of curvature with respect to an axis or line drawn between opposite ends of the group of tines. In this regard, the curvature can also be defined as an arc. According to another embodiment, the orientation of the grooming elements can be provided in a linear orientation or straight-line orientation.

According to another specific embodiment of the device, the tines may incorporate a mid-support or stiffener that enables increased variability on the flexibility of the tines.

The number of tines incorporated on the device can be varied. An increased number of tines can be used for grooming a corresponding larger surface area of the animal, such as the animal's torso. A fewer number of tines can be selected to groom areas on the animal that are more difficult to reach or smaller surface areas of the animal, such as the legs, paws/hoofs, and head.

The grooming elements may be replaced as they become worn or if the user decides to select a different type of grooming action based on the specific configuration of the teeth of the elements. According to one embodiment, the distal end of each grooming element may have a pocket that receives a corresponding element. The pocket provides a fictional fit with the grooming element to retain the element within the pocket. The side edges of the grooming element body may have one or more protrusions or grooves that mate with corresponding features of the pocket to frictionally retain the elements. A grooming element may be removed by applying enough tension force to the exposed end of the element to overcome the friction fit between the pocket and the element body, thereby removing the element from within the pocket.

According to another embodiment of the invention, a plurality of grooming elements may be provided on each tine. For example, the tines can be laterally spaced from one another with each tine having a plurality of grooming elements that are spaced longitudinally from one another along the distal portion of the tine.

Considering the foregoing features of the invention, in one aspect, the grooming device of the invention may comprise a handle; a plurality of tines each having a proximal end secured to said handle and a distal end extending away from the handle; a bend incorporated at the distal end of each tine; the plurality of tines being spaced from one another laterally; a grooming element secured to each tine, said grooming element having an exposed end with a plurality of teeth formed thereon; and wherein a first group of tines and corresponding grooming elements form a first row and a second group of tines and corresponding grooming elements form a second row that is longitudinally spaced from said first row.

Optional features of this first aspect of the invention may include wherein: said plurality of tines extend laterally and are configured to have an arc shape at said distal ends thereof; said bend forms an angle of between about 60 to 90 degrees; said handle has a plurality of grooves formed on opposite side edges thereof; said tines are substantially uniformly spaced from one another; said tines are spaced from one another non-uniformly; or further including a mid-support extending laterally across and connected to said tines.

According to a second aspect of the invention, it may be considered a grooming device comprising: a handle; a plurality of tines each having a proximal end secured to said handle and a distal end extending away from the handle; the plurality of tines being spaced from one another laterally; a plurality of grooming elements secured to each tine, each grooming element having an exposed end with a plurality of teeth formed thereon; and wherein said plurality of grooming elements on each tine are spaced longitudinally from one another.

According to a third aspect of the invention, it may be considered a grooming device comprising: a handle; a plurality of tines each having a proximal end secured to said handle and a distal end extending away from the handle; the plurality of tines being spaced from one another laterally; a grooming element secured to each tine or secured to a pair of tines, said grooming element having an exposed end with a plurality of teeth formed thereon; and wherein said grooming element is V-shaped and said plurality of teeth are presented in said V-shape when contacting targeted fur of an animal.

According to a fourth aspect of the invention, it may be considered a grooming device comprising: a handle; a plurality of tines each having a proximal end secured to said handle and a distal end extending away from the handle; a bend incorporated at the distal end of each tine; the plurality of tines being spaced from one another laterally; a grooming element integral with each tine, said grooming element having an exposed end with a plurality of teeth formed thereon; wherein a first group of tines and corresponding grooming elements form a first row and a second group of tines and corresponding grooming elements form a second row that is longitudinally spaced from said first row; and wherein said plurality of tines are substantially planar with respect to one another.

According to a fifth aspect of the invention, it may be considered a grooming device comprising: a handle; a plurality of tines each having a proximal end secured to said handle and a distal end extending away from the handle; the plurality of tines being spaced from one another laterally; and a grooming element integral with a corresponding tine of said plurality of tines, each grooming element having a top portion that curves in an angular manner so that the top portion forms a bend that is substantially perpendicular to a direction of a body of the tine, the top portion terminating at a point, a bottom curved portion disposed opposite the top portion, wherein a side portion of the grooming element having one of a V-shape or a U-shape.

According to a sixth aspect of the invention, it may be considered a grooming device comprising: a handle; a plurality of tines each having a proximal end secured to said handle and a distal end extending away from the handle; the plurality of tines being spaced from one another laterally and said plurality of tines being offset from one another in a lateral direction; a grooming element integral with each tine, said grooming element having a hook shape, wherein the grooming element has a tip that terminates at a converging point and an inner surface of the tip has a sharpened edge.

According to a seventh aspect of the invention, it may be considered a method of grooming an animal with a grooming device for removing hair or fur from the animal, said method comprising: providing the grooming device having (a) a handle, (b) a plurality of tines each having a proximal end secured to said handle and the distal end extending away from the handle, the plurality of tines being spaced from one another laterally, (c) a grooming element secured to each tine; contacting the animal with the grooming elements so to selectively separate and remove hair or fur from the animal and wherein each grooming element has a top portion that curves in an angular manner so that the top portion forms a bend that is substantially perpendicular to a direction of a body of the tine, the top portion terminating at a point, a bottom curved portion disposed opposite to the top portion, and wherein a side portion of the grooming element has one of a V-shape or a U-shape.

According to an eighth aspect of the invention, it may be considered a method of grooming an animal with a grooming device for removing hair or fur from the animal, said method comprising: providing the grooming device having (a) a handle, (b) a plurality of tines each having a proximal end secured to said handle and the distal end extending away from the handle, the plurality of tines being spaced from one another laterally, (c) a grooming element secured to each tine; contacting the animal with the grooming elements so to selectively separate and remove hair or fur from the animal and wherein each grooming element has an exposed end with a plurality of teeth formed thereon, wherein a first group of tines and corresponding grooming elements form a first row and a second group of tines and corresponding grooming elements form a second row that is longitudinally spaced from said first row; wherein said plurality of tines are substantially planar with respect to one another, wherein the plurality of tines are arranged in an array with an overall width between about 3.5 to 4.0 inches and the tines each having a length of between about 2.0 to 4.0 inches.

Further optional features of any of the above aspects of the invention may include wherein: said plurality of teeth each have a pointed shape; said plurality of teeth each have a rectangular shape; said plurality of teeth each have a curved shape; or wherein said plurality of teeth each have a curved shape and adjacent teeth of said plurality of teeth extend laterally beyond opposite side edges of said grooming element.

Additional features and advantages of the invention will become apparent from a review of the following detailed description taken in conjunction with the drawings.

BRIEF DESCRIPTION OF THE DRAWINGS

FIG. 35 is bottom perspective view of the embodiment of FIG. 33;

FIG. 36 is an enlarged perspective view of one of the tine tips shown in FIG. 35;

DETAILED DESCRIPTION

Figure 1:
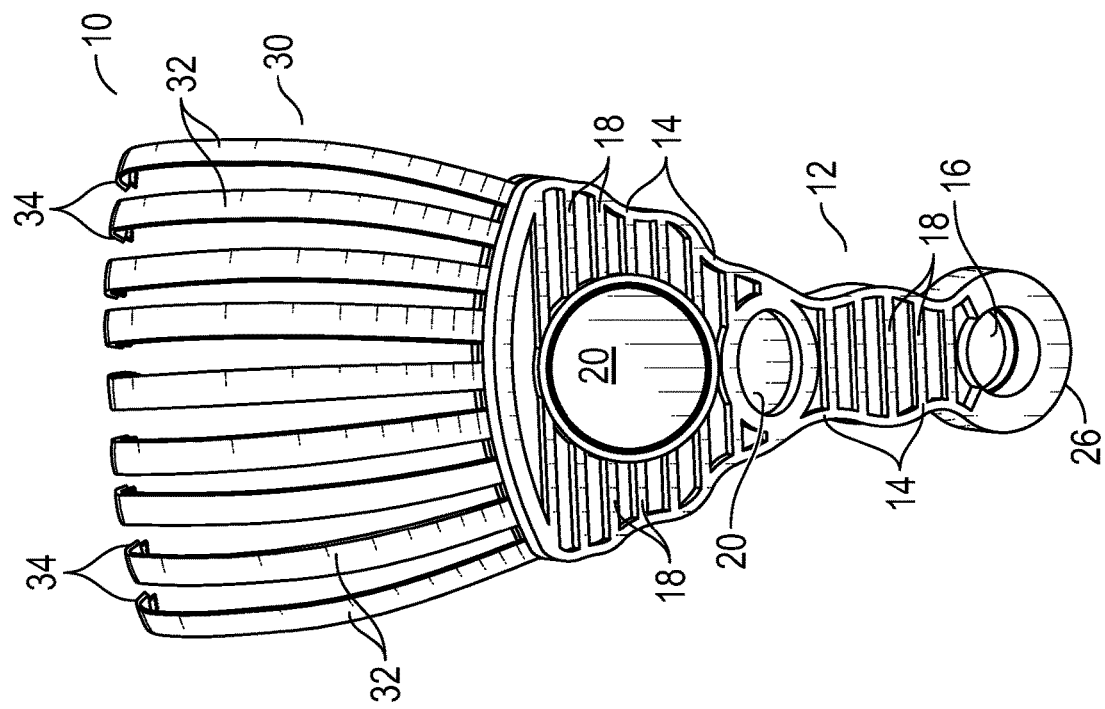
FIG. 1 is a front perspective view of a preferred embodiment of the grooming device of the invention.

FIG. 1 illustrates a first embodiment of the grooming device of the invention. The device 10 comprises a handle 12, a plurality of tines 30 and a corresponding plurality of grooming elements 50 secured to the distal ends of the tines. Each tine 30 can be further defined as having a shaft or body 32. Also referring to FIG. 2, the bodies 32 are shown as having a uniform shape including substantially full thicknesses and widths. The lengths of the bodies 32 of the tines can be selected to provide variable contact of the grooming elements 50 with the animal. In other words, the tines may present a staggered arrangement of the grooming elements in contact with the animal or the tines may present a linear or straight arrangement of grooming elements in contact. Further, the tines can be arranged to present a collective flat or linear arrangement of the grooming elements in contact; or the tines can be arranged to present a curved or arc shaped arrangement of the grooming elements in contact. According to the embodiment in FIGS. 1 and 2, the tines are arranged to present a linear arrangement of the grooming elements 50.

The handle 12 may include a plurality of indentations or grooves 14 which enable the fingers of the user's hand to be conveniently placed as desired in the grooves in order to enhance gripping and control of the grooming device. The gripping end 26 of the device may have a through hole 16 to allow the grooming device to be hung for storage. The handle may further include a plurality of support ribs 18 to add sufficient strength and rigidity to the handle, as well as to add some ornamentality to the appearance of the device. One or more center ornamentation areas 20 may be devoid of support ribs to allow for placement of a desired trademark or design.

Figure 2:
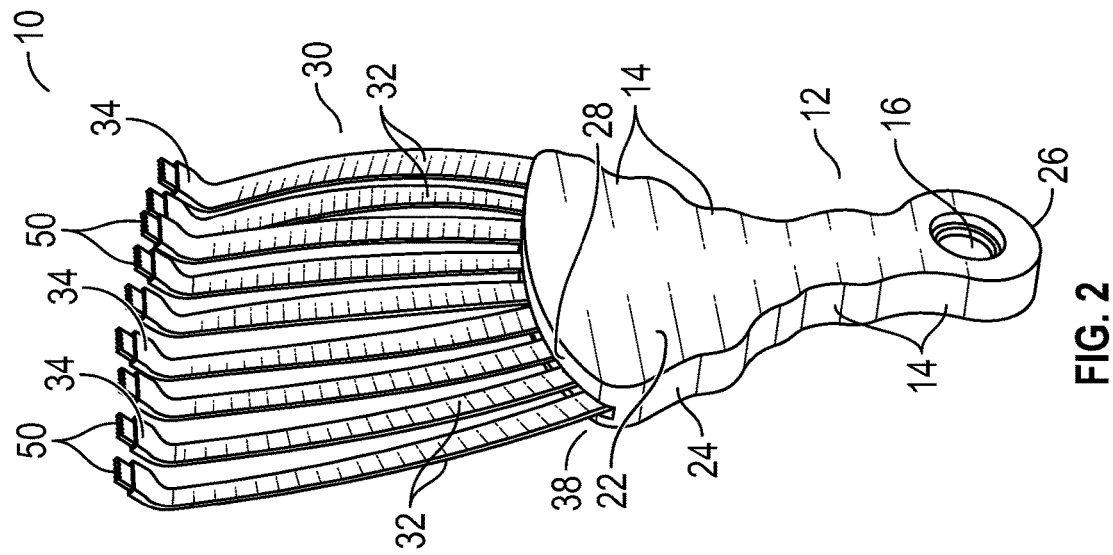
FIG. 2 is a rear perspective view of the embodiment of FIG. 1.
Figure 3:
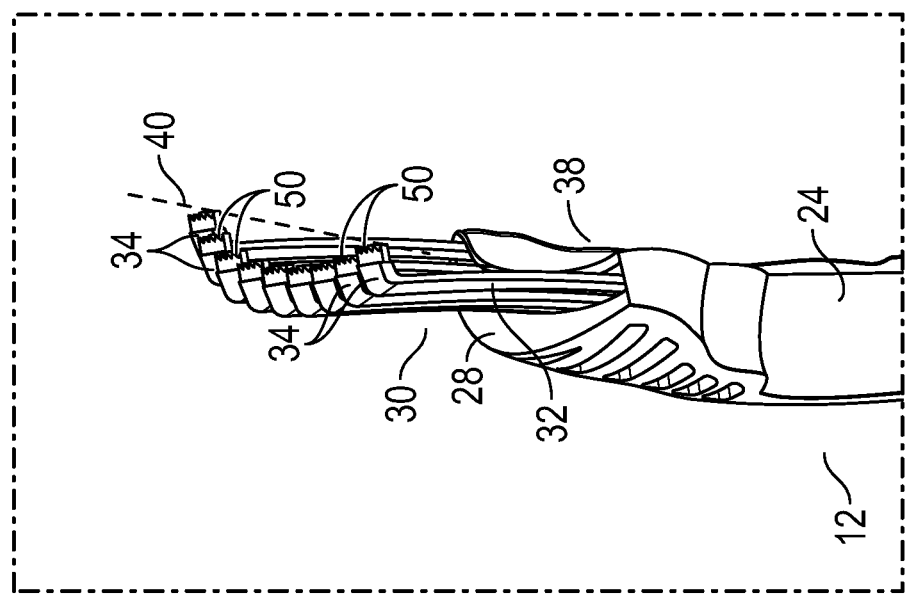
FIG. 3 is an enlarged side view of a distal portion of the grooming device of FIG. 1 showing the arrangement of the tines and mounted grooming elements.

FIG. 2 shows the rear side 22 as being substantially flat or planar; however, the rear side may also incorporate support ribs 18 and/or center areas 20 as desired. The side edge 24 defines a thickness of the handle. Referring specifically to FIGS. 2 and 3, the proximal ends of the tines 30 are received and secured in a continuous slot or groove 38 located at a curved receiving end 28 of the handle.

Figure 4:
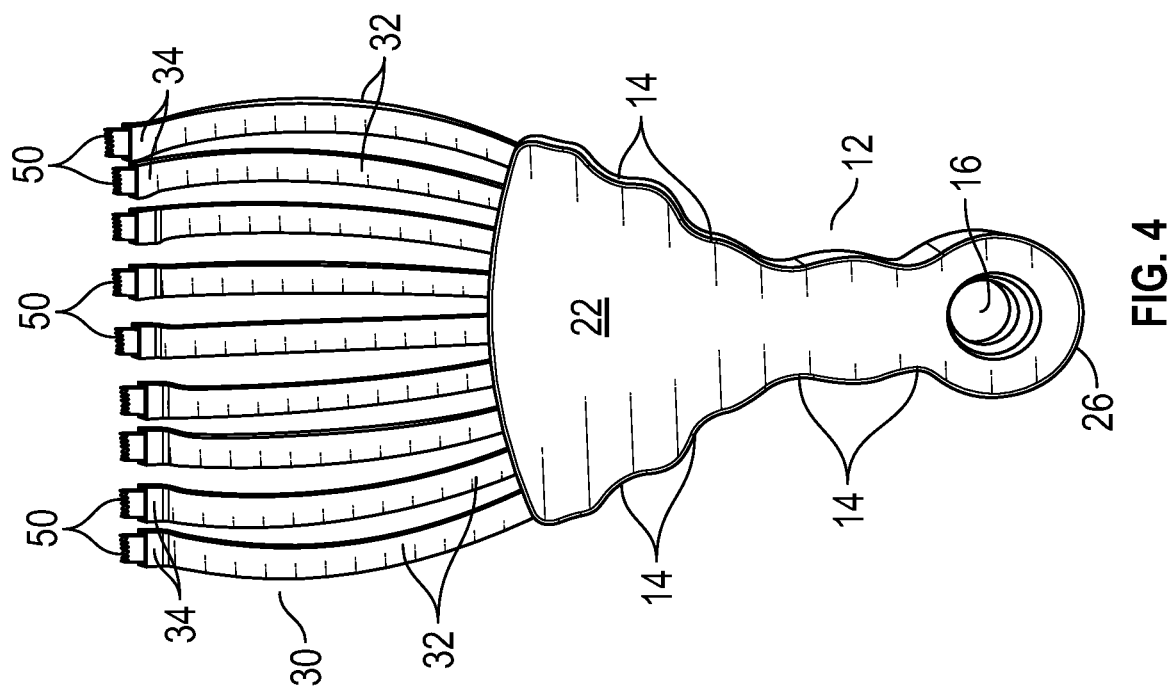
FIG. 4 is a rear view of the embodiment of FIG. 1.

Referring also to FIGS. 3 and 4, the distal ends of the tines 30 have a distinct bend 34 which therefore alters the angular orientation of the tines 30 such that the tines are placed at a near perpendicular angle with respect to a surface of the animal that is to be groomed. As shown, the bend 34 is slightly less than 90° however the particular angle selected could be between about 60° to 90° to place the grooming elements at an optimal position for contact with the animal's fur.

FIG. 3 specifically shows the slight curved or arced arrangement of the distal ends of the tines. The dotted line in this figure extends between the opposite ends of the tines, and one can see the general curvature or arc of the distal ends in relation to this dotted line.

From a review of the first embodiment shown in FIGS. 1-4, one should appreciate the enhanced functionality of the grooming device as compared to traditional brushes or combs. First, the plurality of tines 30 with separate and distinct grooming elements 58 enables the grooming device to better follow and engage the animal's fur because there is no surface of the animal which is completely flat. The independent flexing and movement of each of the tine and grooming element combinations can therefore better follow and contact the contours of the animal. Compare this independent operation of the tine/grooming element combinations to a standard comb or brush in which the bristles or teeth are typically secured to a single base surface and therefore, the bristles or teeth cannot be as easily displaced or separated from one another while contacting the contours of the animal. This lack of flexibility results in some bristles or teeth placing much greater pressure on the animal's fur in some locations, while other bristles or teeth place appreciably less pressure on the animal's fur. This inconsistent pressure placement makes it more difficult for the user to selectively apply a substantially uniform amount of pressure across the contours of the animal while grooming.

Figure 5:
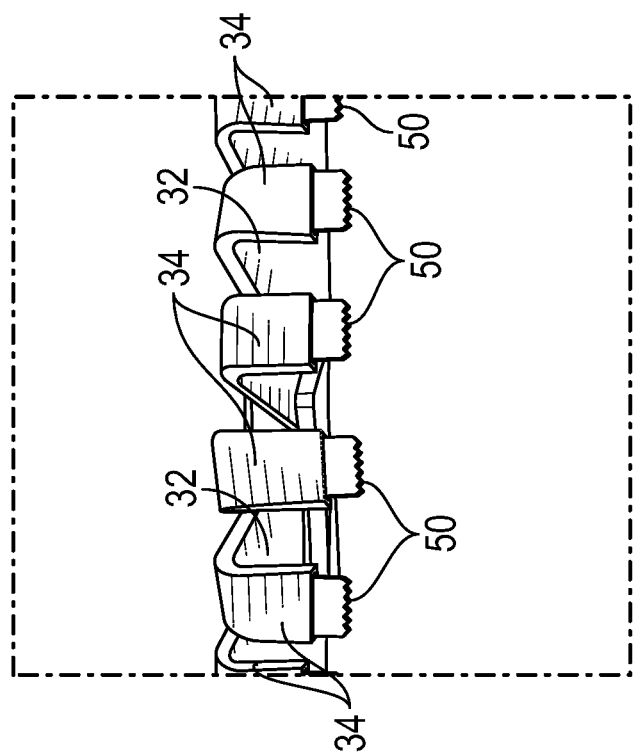
FIG. 5 is a greatly enlarged partial top view of the tines and grooming elements of FIG. 1.

FIG. 5 is a greatly enlarged view of the tines and grooming elements of the embodiment of FIG. 1. This figure also illustrates the arrangement of the bends 34 at the distal ends of the tine bodies 32 in which the bends are made at approximately 90°. The grooming elements 50 are illustrated so that the teeth of the grooming elements are presented in an essentially perpendicular arrangement with a surface to be groomed.

Figure 6:
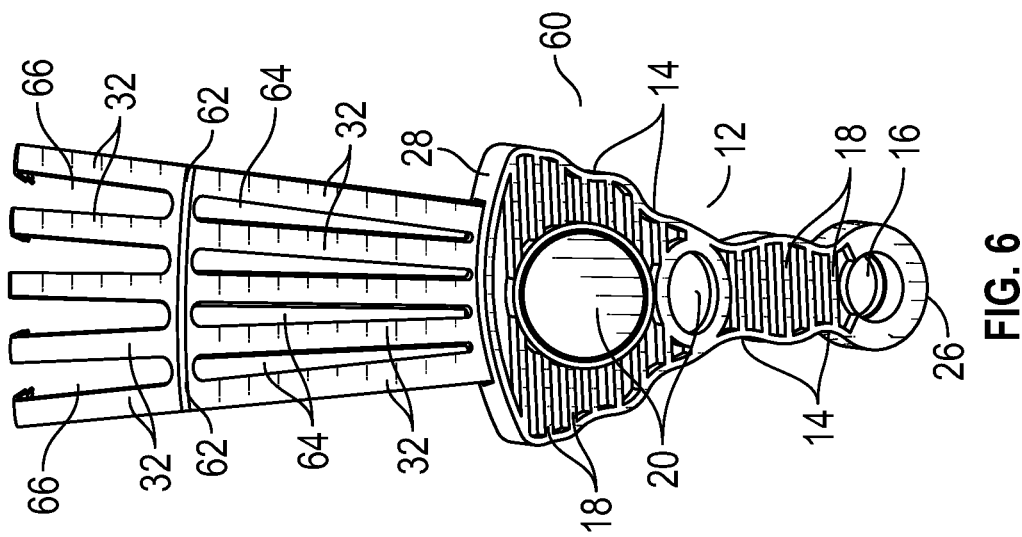
FIG. 6 is a front perspective view of another preferred embodiments showing the grooming device with a fewer number of tines and an intermediate tine support located between the proximal and distal ends of the tines.

FIG. 6 is a front perspective view of another preferred embodiments showing the grooming device with a fewer number of tines 30 and an intermediate tine support 62 located between the proximal and distal ends of the tines 30. The support 62 can add additional rigidity and strength to the tines 30. According to this embodiment, there are two separate and distinct flexing actions that are provided: a first flexing action for the portion of the tines between the handle 12 and the intermediate support 62, and a second flexing action for the portion of the tines that extend beyond the intermediate support 62. Therefore, yet further functionality is provided for the grooming device of this embodiment with respect to overall flexibility and rigidity of the tines.

Figure 7:
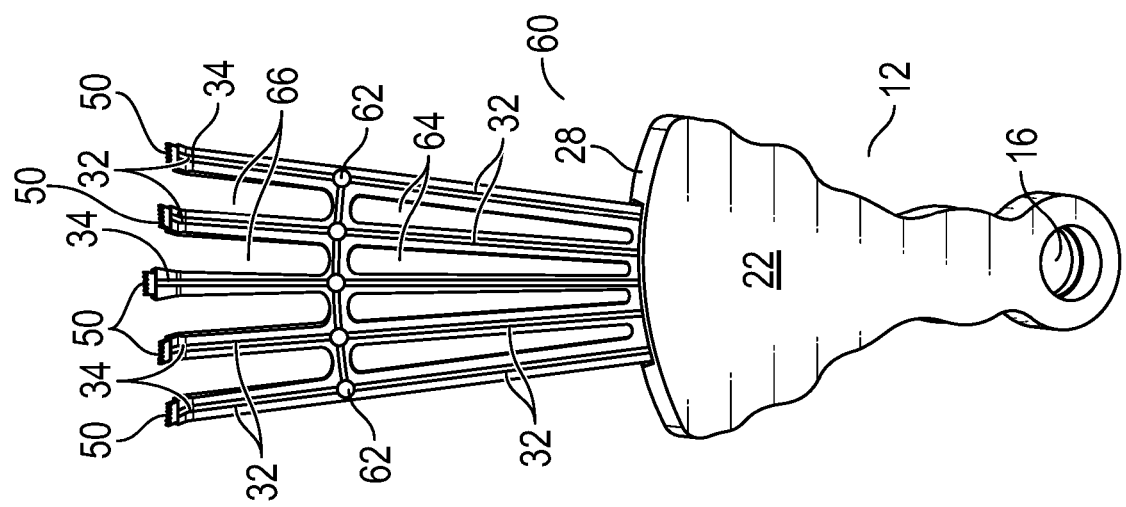
FIG. 7 is a rear perspective view of the embodiment of FIG. 6.

Because there are fewer tines in the embodiment of FIG. 6, this allows the grooming device to engage smaller surface areas on an animal that may be more difficult to reach with a greater number of tines. Such smaller surface areas could include the legs, paws/hoofs and head of the animal. FIG. 7 is a rear perspective view of the embodiment of FIG. 6, noting that the rear side is also flat or planar like the first embodiment.

Figure 9:
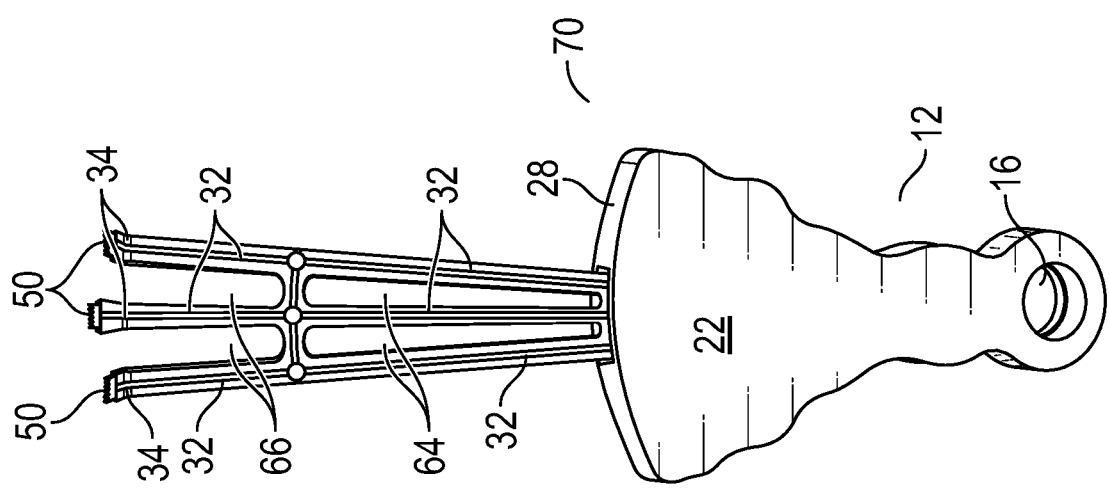
FIG. 9 is a rear perspective view of the embodiment of FIG. 8.
Figure 8:
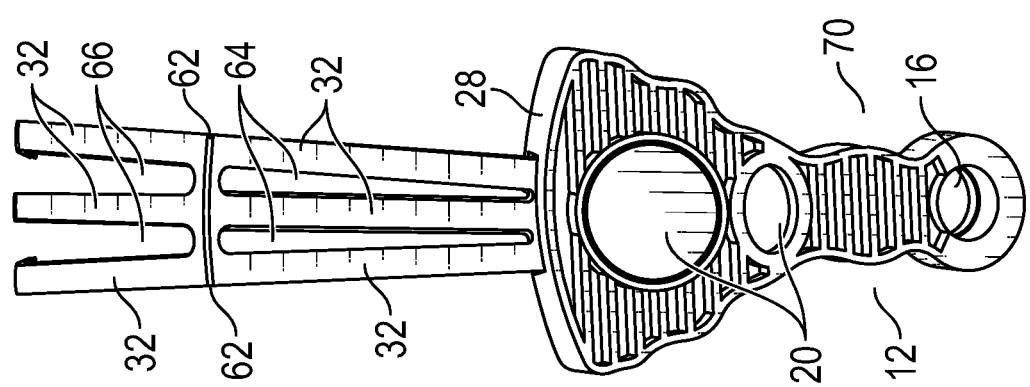
FIG. 8 is a perspective view of yet another preferred embodiment, similar to the preferred embodiment of FIG. 6 but having fewer tines.

FIG. 8 is a perspective view of another preferred embodiment, similar to the preferred embodiment of FIG. 6 but having yet fewer tines 30. FIG. 9 is a rear perspective view of the embodiment of FIG. 8. This embodiment may be particularly useful to groom the smaller surface areas of an animal in which only a few tines can reach the areas of the animal. The same functionality and advantages applied to this embodiment in which there are multiple flexing actions.

Figure 10:
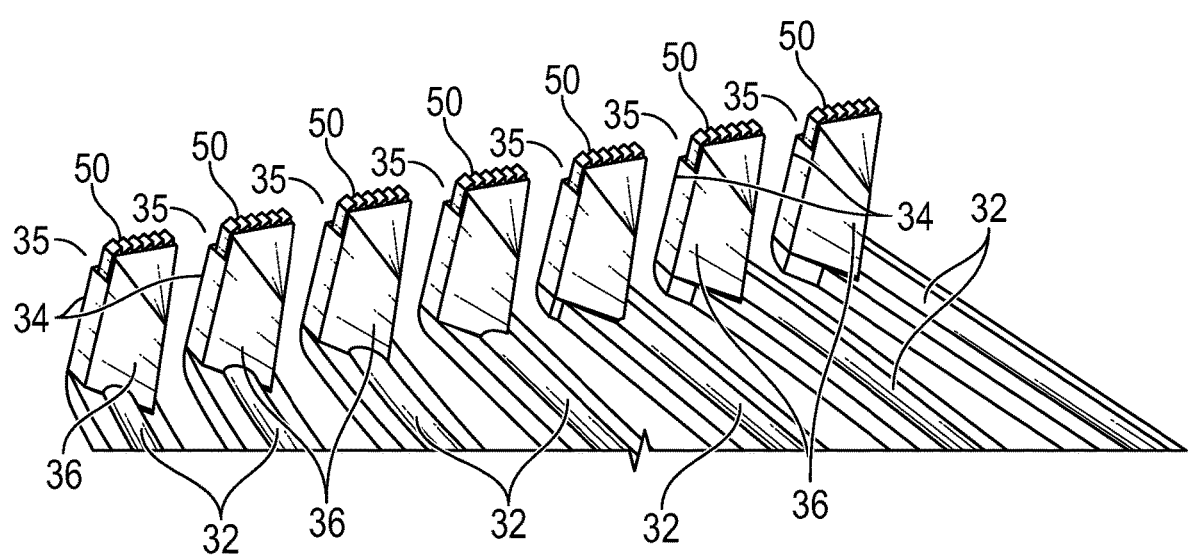
FIG. 10 is a greatly enlarged fragmentary perspective view of the distal ends of a plurality of tines and grooming elements, showing a pocket for each tine that receives a corresponding grooming element.

FIG. 10 is a greatly enlarged fragmentary perspective view of the distal ends of a plurality of tines 30 and grooming elements 50, showing a pocket 35 for each tine that receives a corresponding grooming element 50. The grooming elements are sized to frictionally engage the pocket 35. Some amount of an adhesive can also be applied to the grooming elements to help secure them within the pockets 35. At which point in time a user decides to change the type of grooming element, or if one or more grooming elements become worn or damaged, the grooming elements can be easily replaced. To remove a grooming element, the user could use needle nose pliers to grasp the exposed ends of the grooming elements. FIG. 10 also illustrates another feature of the invention, namely, thickened areas 36 added to the distal ends of the tines in order to provide greater strength and stability for the grooming elements 50. As shown, these thickened areas have a triangular-shaped cross-section. It should be understood that any of the embodiments disclosed herein can adopt the thickened areas 36 for any one or more of the tines 50.

FIGS. 11-16 illustrate details for different types of grooming elements or blades 50. Beginning with FIG. 11, this shows a greatly enlarged perspective view of one example of a replaceable grooming element or blade. This particular grooming element is characterized as having a plurality of serrated or curved teeth 52, a stem 54, and a locking tab 56. With this particular grooming element, it is configured to be placed in a pocket which receives the stem 54, and the locking tabs 56 engage corresponding slots (not shown) within the pocket to therefore secure the grooming element.

Figure 12:
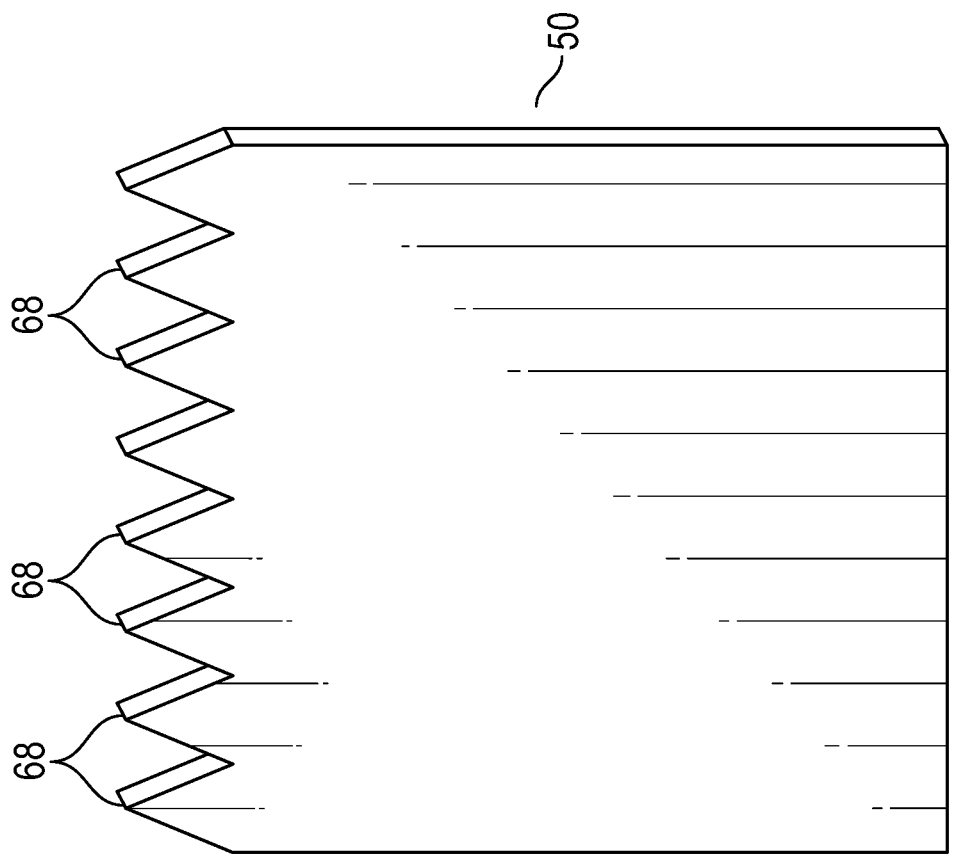
FIG. 12 is a greatly enlarged perspective view of another example of a replaceable grooming element or blade according to the invention.
Figure 11:
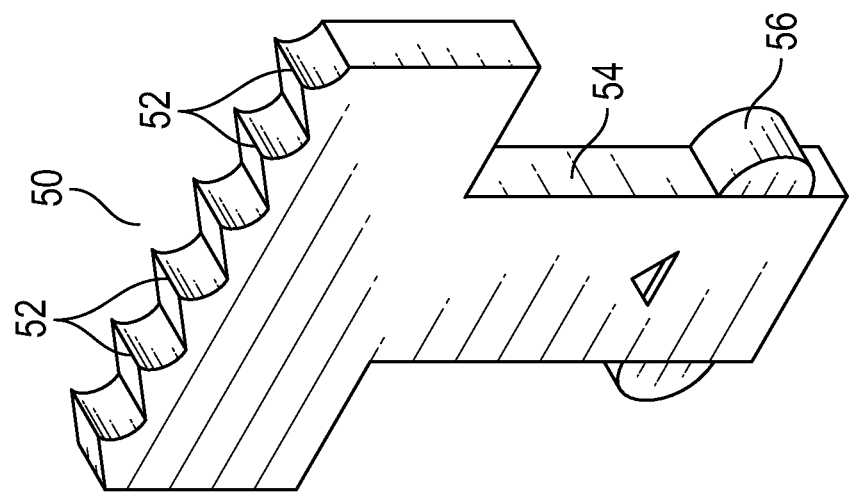
FIG. 11 is a greatly enlarged perspective view of one example of a replaceable grooming element or blade according to the invention.

FIG. 12 is a greatly enlarged perspective view of another example of a replaceable grooming element or blade according to the invention. The shape of this grooming element is substantially rectangular, and the contact service or working end of the grooming element includes a plurality of tapered teeth 68.

Figure 13:
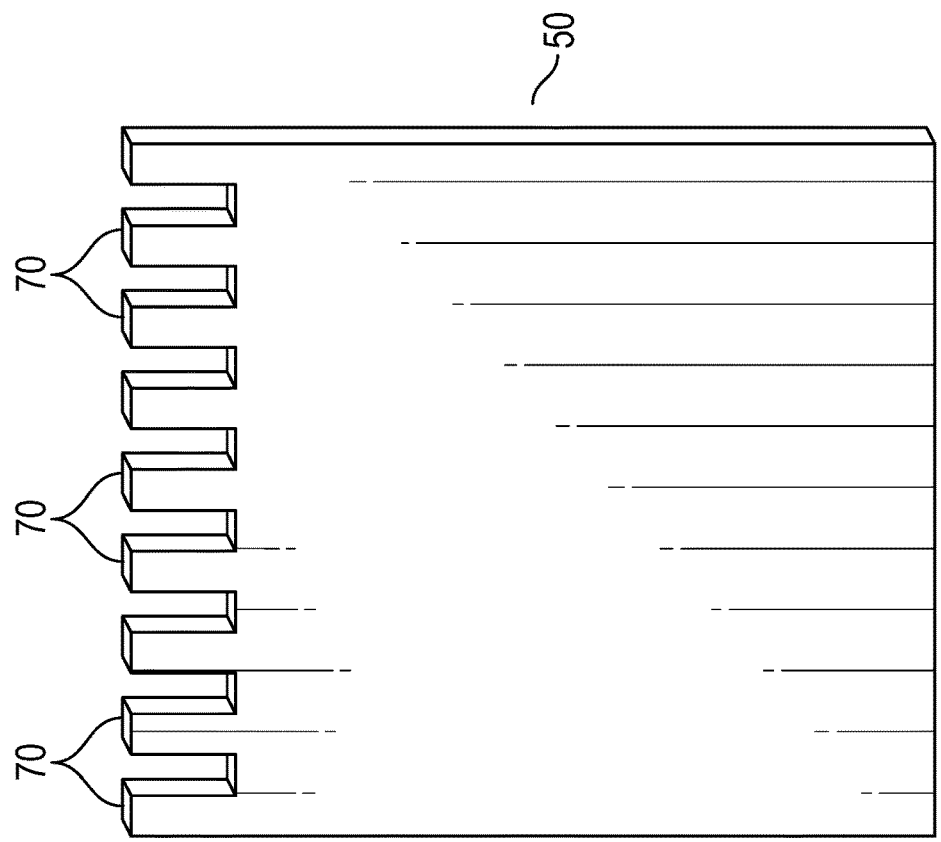
FIG. 13 is a greatly enlarged perspective view of another example of a replaceable grooming element or blade according to the invention.

FIG. 13 is a greatly enlarged perspective view of another example of a replaceable grooming element or blade according to the invention. The shape of this grooming element is again substantially rectangular, but the contact surface or working end includes a plurality of rectangular shaped teeth 70.

Figure 14:
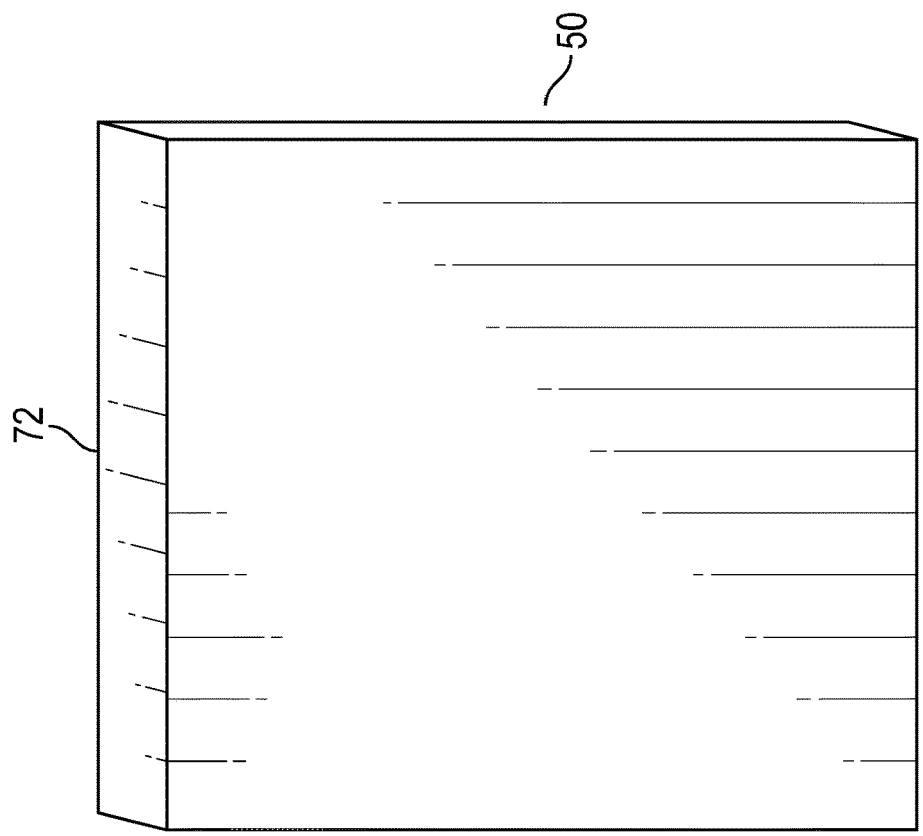
FIG. 14 is a greatly enlarged perspective view of another example of a replaceable grooming element or blade according to the invention.

FIG. 14 is a greatly enlarged perspective view of another example of a replaceable grooming element or blade according to the invention. This grooming element does not have a plurality of teeth; rather, this grooming element has a tapered edge 72.

Figure 15:
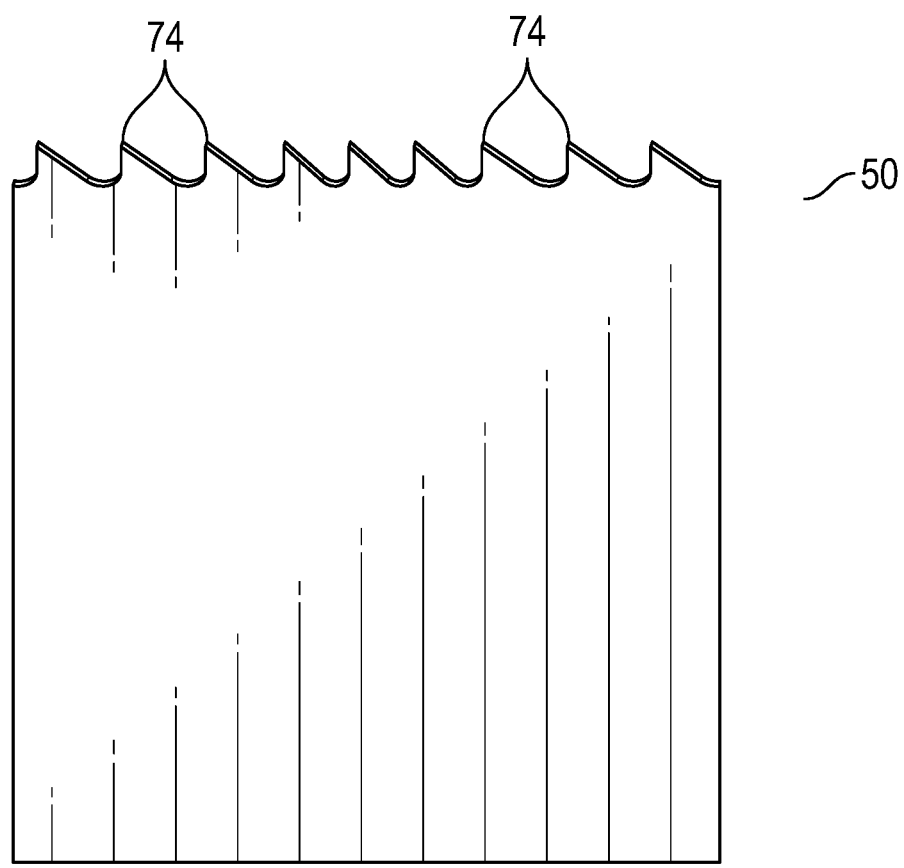
FIG. 15 is a greatly enlarged perspective view of another example of a replaceable grooming element or blade according to the invention.
Figure 16:
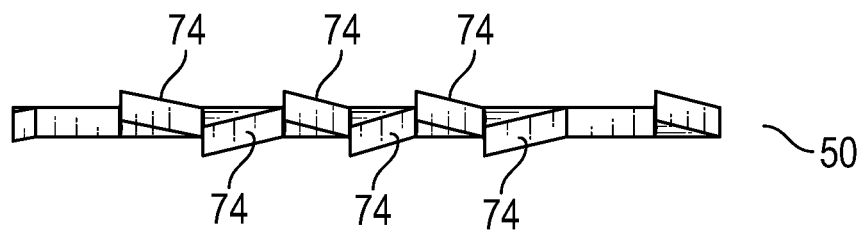
FIG. 16 is a top plan view of the teeth arrangement of FIG. 15.

FIG. 15 is a greatly enlarged perspective view of yet another example of a replaceable grooming element or blade according to the invention. This example is similar to the grooming element shown in FIG. 11 with serrated or curved teeth; however, the teeth 74 in this example are offset from one another along a line or axis that extends along the upper or top surface of the grooming element, as shown in the top plan view of FIG. 16. The teeth 74 have upper ends that are offset in an alternating fashion such that one tooth extends laterally beyond one side of the grooming element and the next tooth extends laterally beyond the opposite side of the grooming element. This specific arrangement of the teeth 74 therefore resembles teeth in a cutting device such as a hacksaw blade.

Figure 17:
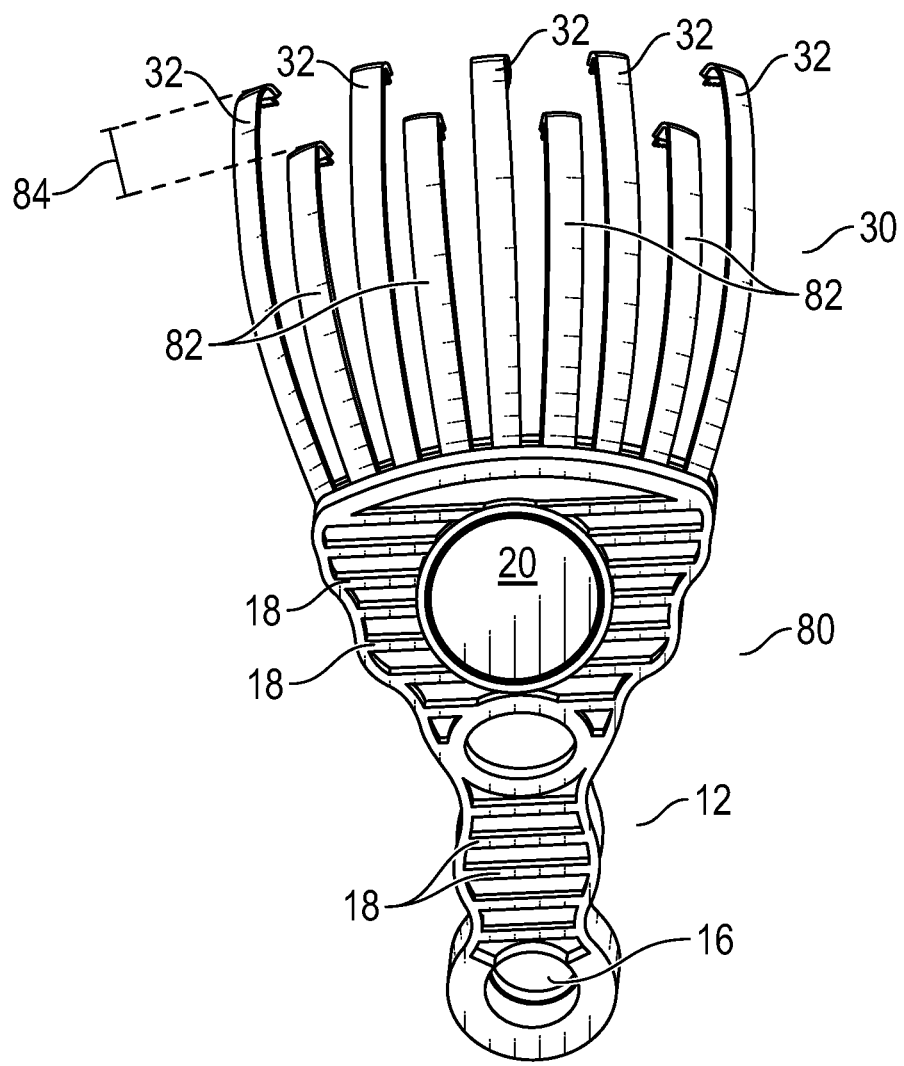
FIG. 17 is a front perspective view of another preferred embodiment of the grooming device of the invention.

FIG. 17 is a front perspective view of another preferred embodiment of the grooming device of the invention in which the tines are separated into shorter and longer lengths resulting in two rows of spaced grooming elements. The rows are spaced from one another by the distance 84. The two rows of grooming elements are disposed in the illustrated alternating arrangement between adjacent grooming elements.

Figure 19:
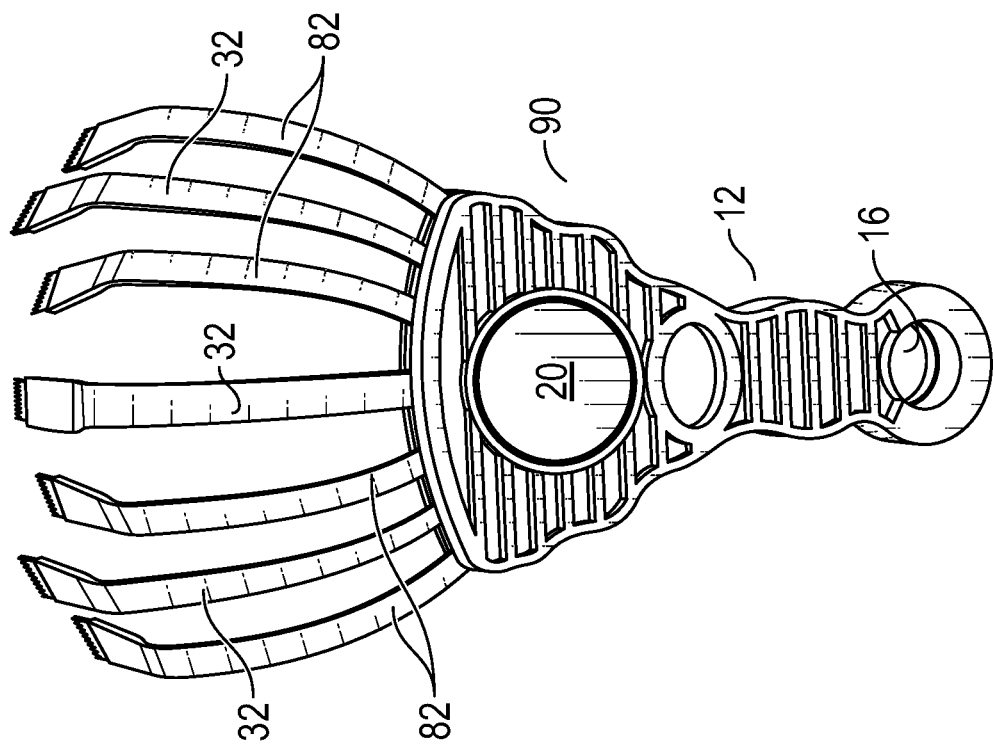
FIG. 19 is a front perspective view of the embodiment of FIG. 18.
Figure 18:
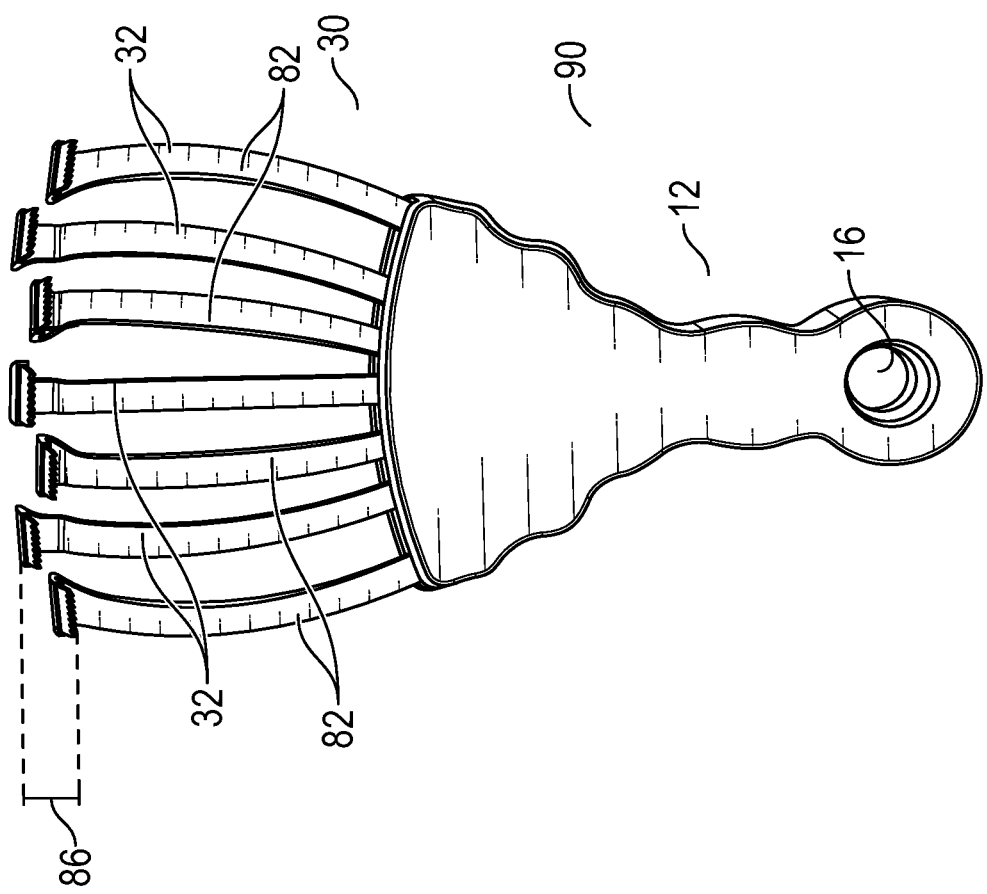
FIG. 18 is a front perspective view of another preferred embodiment of the grooming device of the invention.

FIG. 18 is a rear perspective view of another preferred embodiment of the grooming device of the invention and FIG. 19 is a front perspective view of the embodiment of FIG. 18. This embodiment is similar to the embodiment illustrated in FIG. 17 except that the tines are laterally spaced a great distance from one another and the tines have a greater curvature along their respective lengths. The spacing between the rows is slightly less, shown as spacing distance 86.

Figure 20:
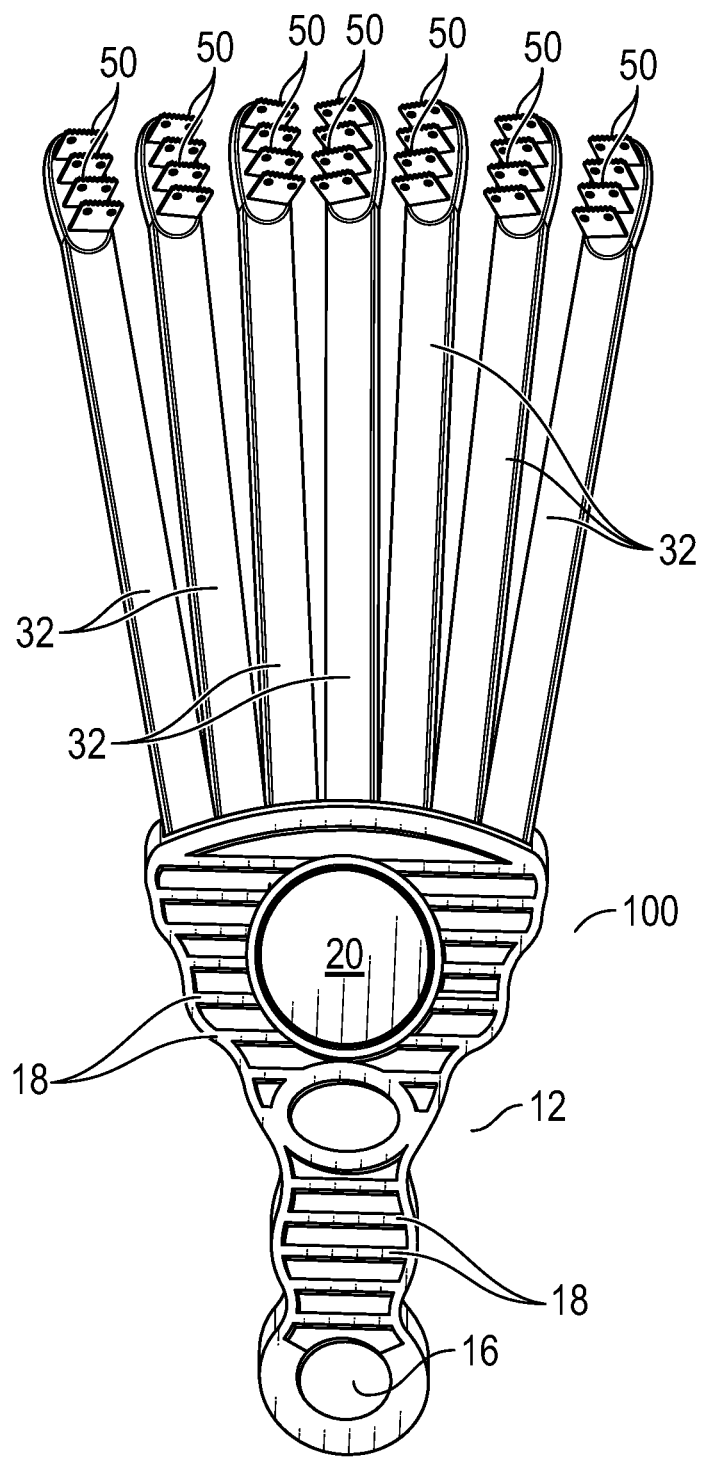
FIG. 20 is a front perspective view of another preferred embodiment of the grooming device of the invention.

FIG. 20 is a perspective view of yet another preferred embodiment of the grooming device of the invention having a plurality of grooming elements 50 secured to each tine. The elements 50 in this embodiment are disposed in multiple rows and spaced longitudinally from one another at the distal portion of the respective tines. The grooming elements in this embodiment may be configured as any of those disclosed in FIGS. 11-16. Further, each tine may adopt one or more different types of grooming elements which provides enhanced grooming capabilities for each tine. The perspective view of FIG. 20 also shows that the side of handle facing the animal to be groomed incorporates the support ribs 18 and ornamentation areas 20; it being understood that either side of the grooming brush or both sides may include ribs 18 and ornamentation areas 20.

Figure 21:
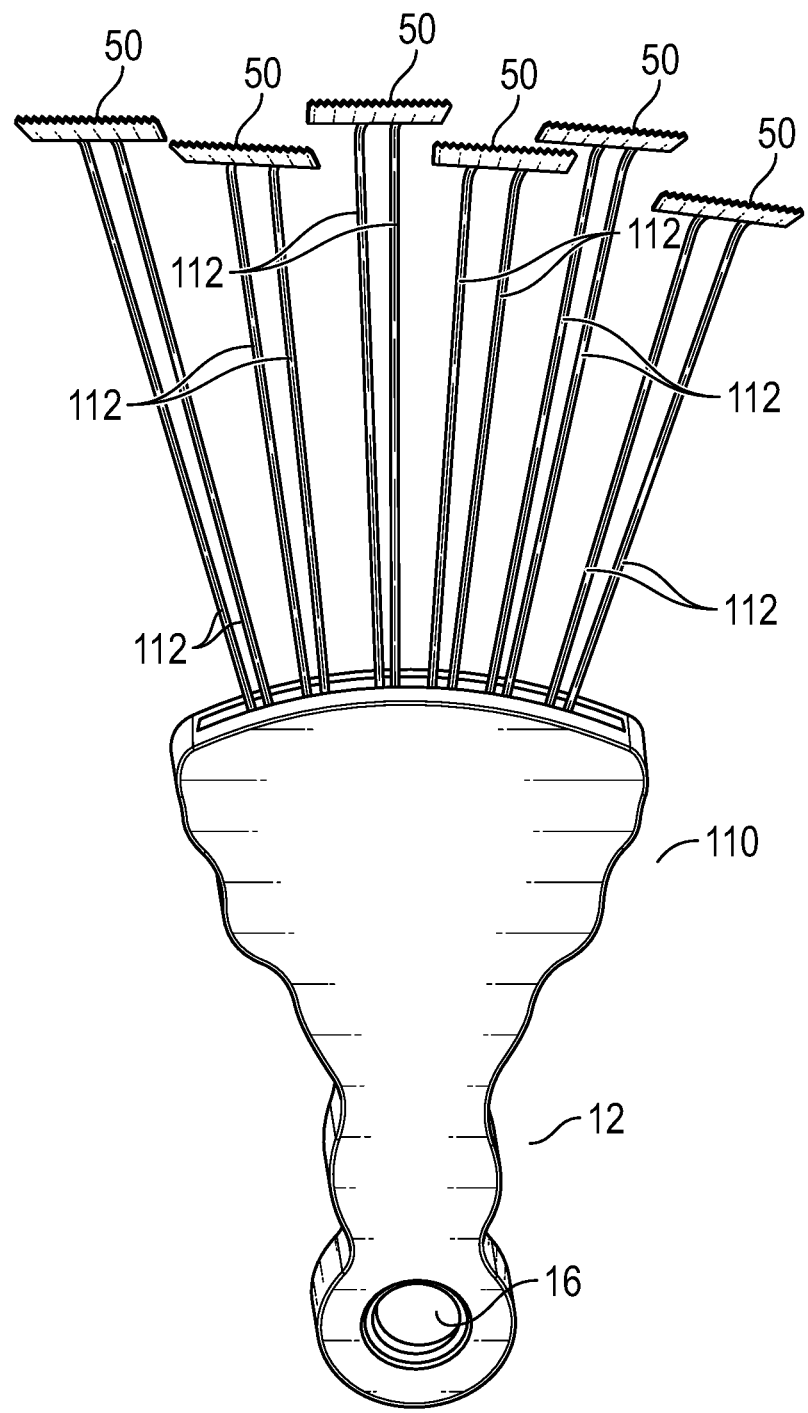
FIG. 21 is a rear perspective view of another preferred embodiment of the grooming device of the invention.
Figure 22:
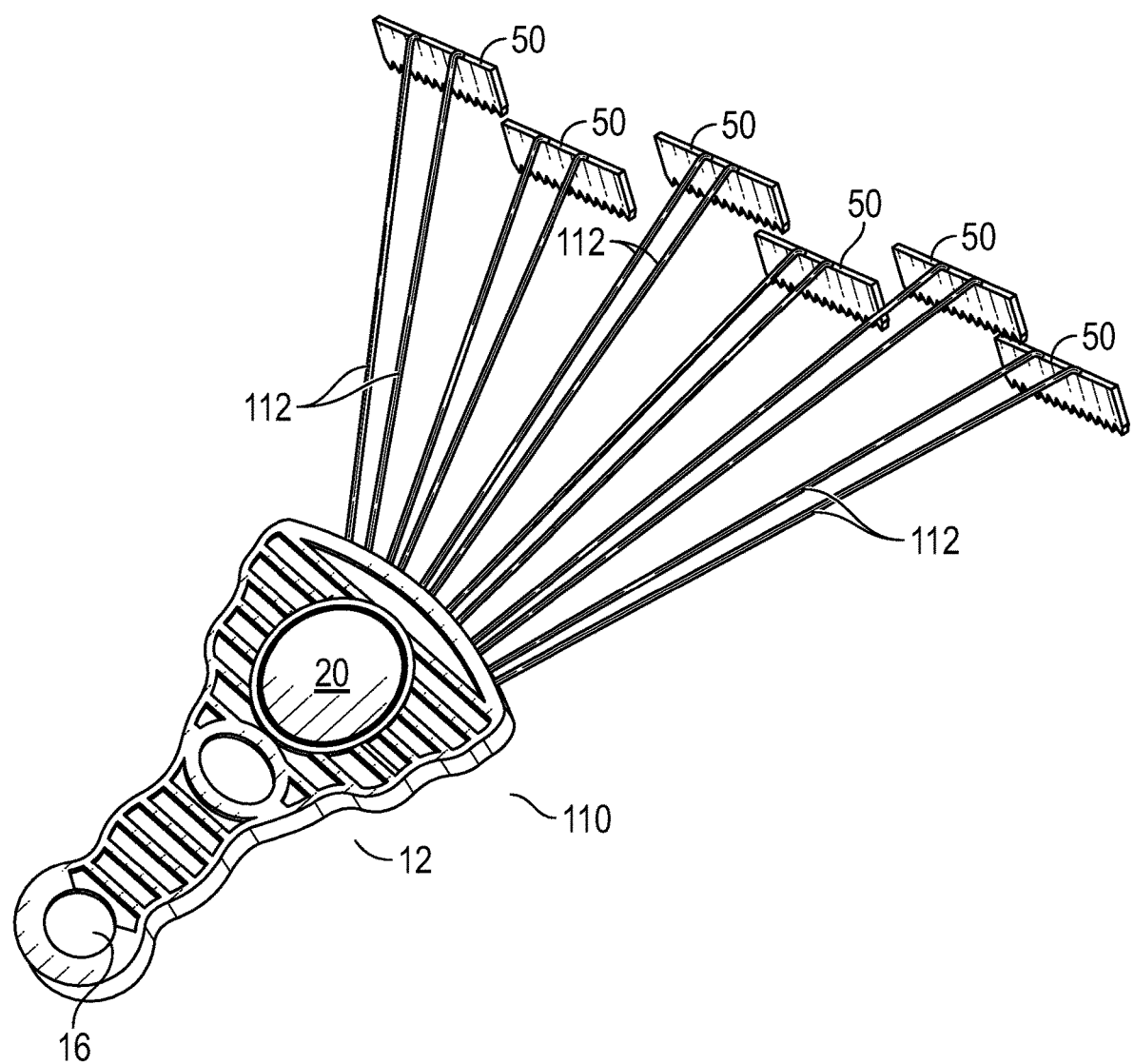
FIG. 22 is a perspective view of the embodiment of FIG. 21.

FIG. 21 is a rear perspective view of another preferred embodiment of the grooming device of the invention. In this embodiment, the tines 112 are wire-like members disposed in pairs. One pair of tines 112 secures a corresponding connected grooming element 50. The particular shapes of the grooming elements are laterally extended rectangles with a greater length or lateral span as compared to the other grooming elements 50. The grooming elements again are shown in two rows with alternating shorter and longer tines 112 placed adjacent to one another. FIG. 22 is a perspective view of the embodiment of FIG. 21 further illustrating how the ends of the tines 112 are connected to the grooming elements 50. For this embodiment, a preferred method of replacing the grooming elements involves a replacement also of the connected pair of tines 112. Accordingly, the proximal ends of the tines secured within the continuous groove of the handle are pulled out and replaced with another tine pair and grooming element combination. In this regard, it is contemplated that the proximal ends of each tine member can be frictionally secured with small corresponding holes (not shown) extending into the handle.

Figure 23:
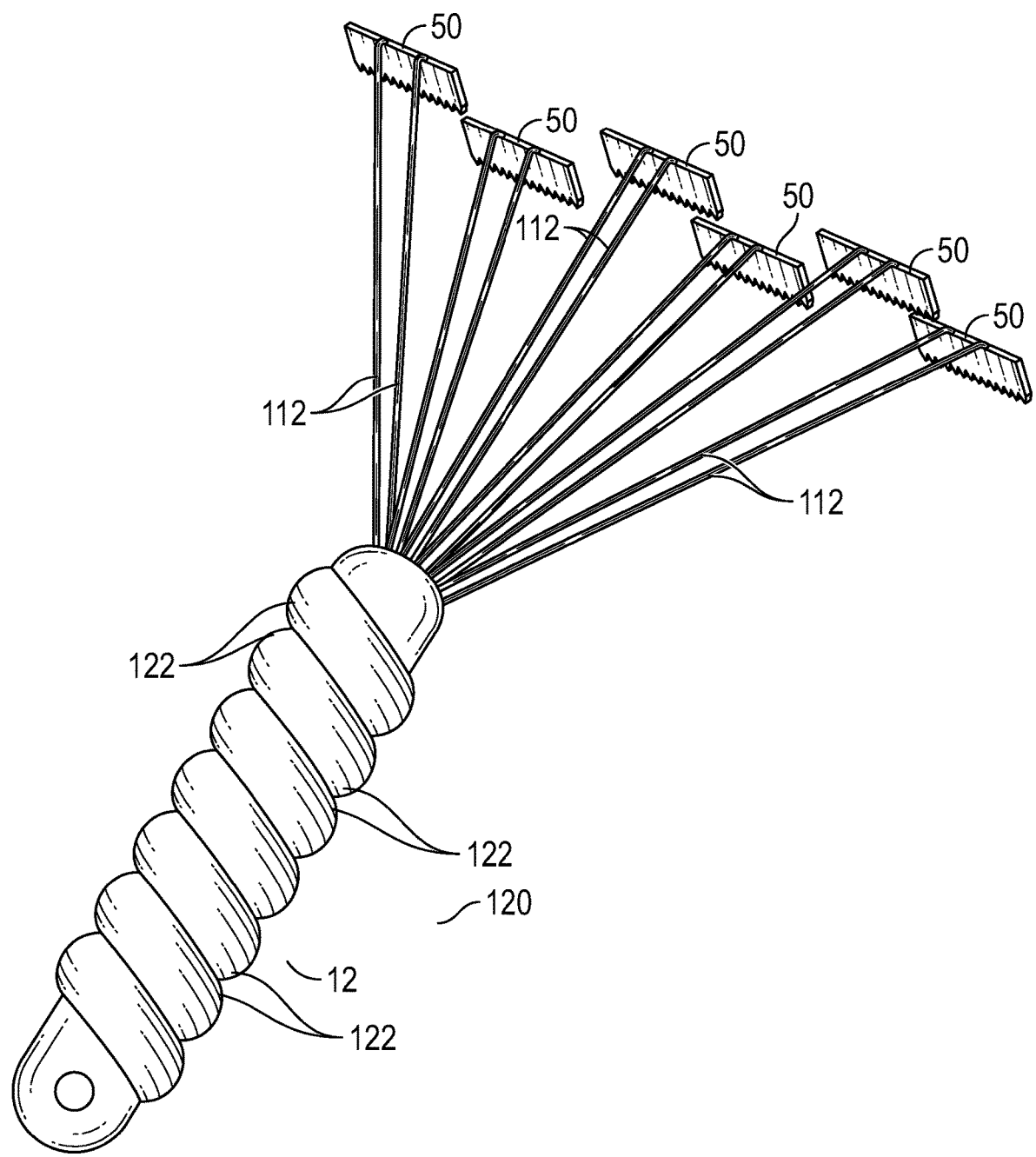
FIG. 23 is a perspective view of another preferred embodiment of the grooming device of the invention.

FIG. 23 is a perspective view of another preferred embodiment of the grooming device of the invention. This embodiment shows a similar arrangement for the tines 112 and grooming elements 50 but provides a different shaped handle 120. The handle 120 can be generally described as having a spiral configuration in which a cordlike member has a plurality of turns 122 that make up the length of the handle. Ridges and grooves are formed by the turns 120 which provide a reliable gripping surface for the hand of the user.

Figure 24:
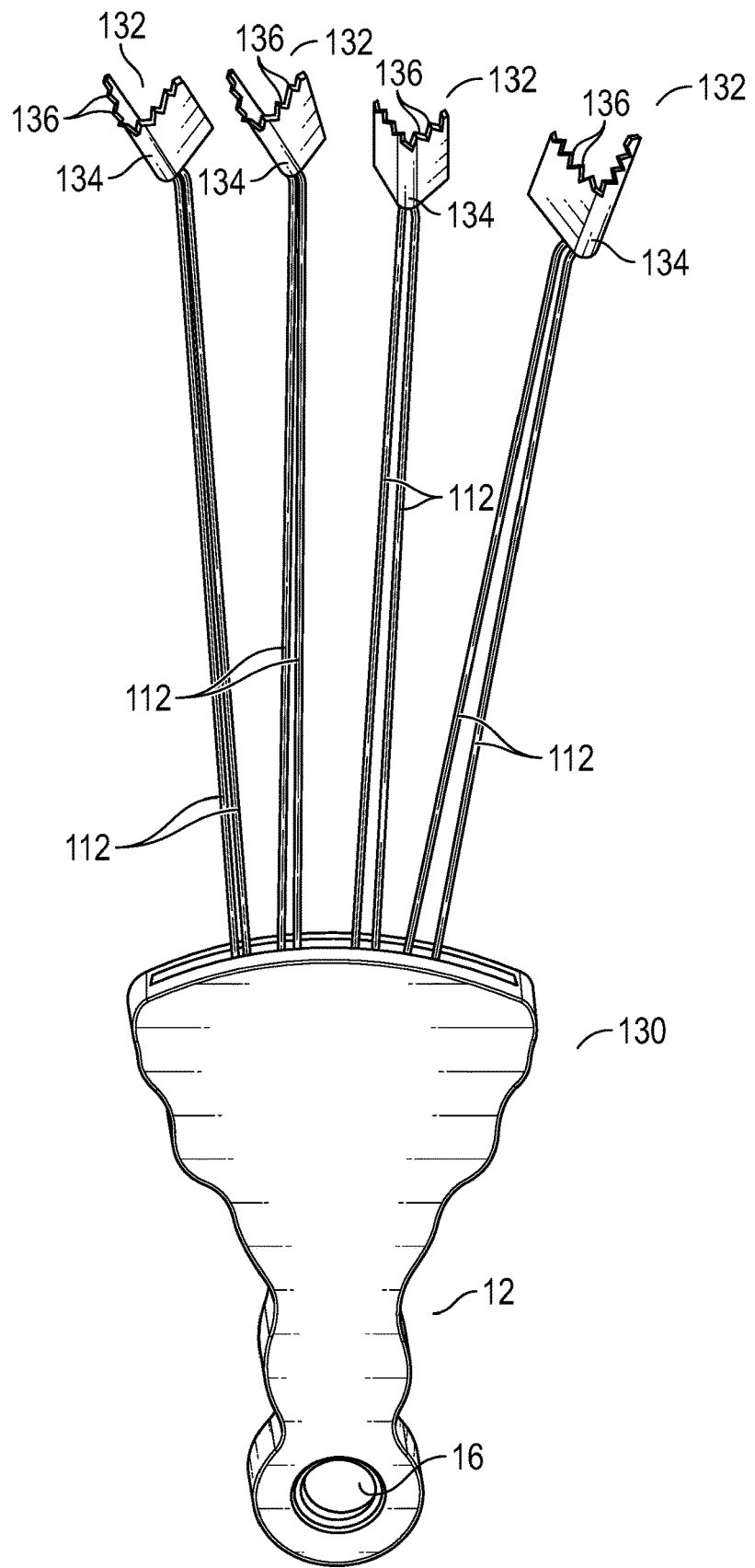
FIG. 24 is a rear perspective view of another preferred embodiment of the grooming device of the invention.

FIG. 24 is a rear perspective view of yet another preferred embodiment of the grooming device of the invention. A plurality of tine pairs 112 are used to support respective angled grooming elements 132. The grooming elements 132 are shown as V-shaped with legs of the grooming element extending away from one another and the legs joined at bend or fold 134. Teeth 136 are disposed on the free exposed ends of the grooming elements. Accordingly, a V-shaped configuration is achieved for contact by the grooming elements with the fur of an animal. This V-shaped configuration provides a unique placement of teeth in which varying grooming motions can be used to comb, separate, and remove different layers of animal fur.

Figure 25:
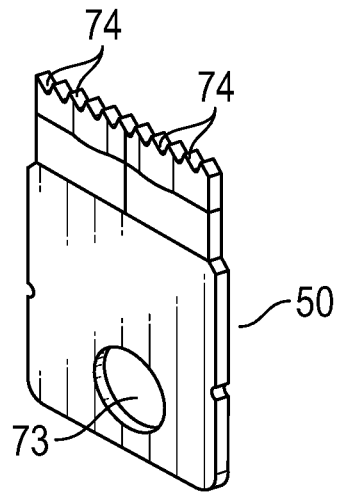
FIG. 25 is an enlarged perspective view of another example of a replaceable grooming element or blade according to the invention.
Figure 26:
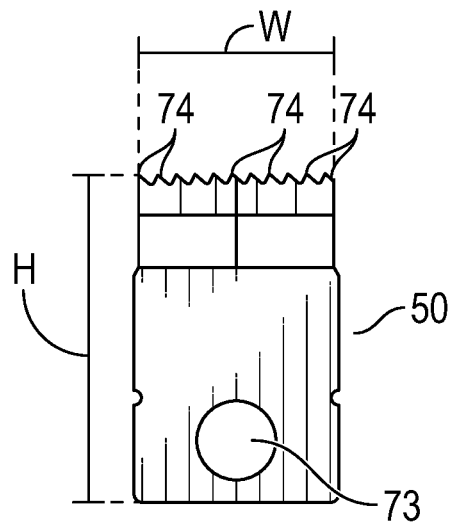
FIG. 26 is a front elevation view of the replaceable grooming element or blade of FIG. 25.
Figure 27:
FIG. 27 is a top plan view of the teeth arrangement of FIG. 25.

FIG. 25 is an enlarged perspective view of yet another example of a replaceable grooming element or blade 50 according to the invention. FIG. 26 is a front elevation view. This grooming element 50 is similar to the grooming element shown in FIG. 15 with serrated or curved teeth. The teeth 74 in this example are also offset from one another along a line or axis that extends along the upper or top surface of the grooming element, as best shown in the top plan view of FIG. 27. The blade 50 is shown with an opening 73 which can be used to assist in securing the blade to the grooming device in which the grooming device may have a corresponding tab or protrusion (not shown) that is placed through the opening. At least one first tooth 74 has an upper end that is offset in an alternating fashion such that the at least one first tooth extends laterally beyond one side of the grooming element. Another second tooth extends laterally beyond the opposite side of the grooming element, the second tooth not necessarily being the next or adjacent tooth, but the second tooth being one that is separated from the first tooth in the group of teeth. This specific arrangement of the teeth 74 in FIGS. 25-27 also resembles teeth in a cutting device such as a hacksaw blade in which the top view of FIG. 27 provides a wavy appearance for the group of teeth. In other words, from this top view, the teeth 74 are not aligned linearly along an axis but rather, the teeth 74 are disposed in an alternate curving arrangement or the teeth have an undulating appearance.

Figure 28:
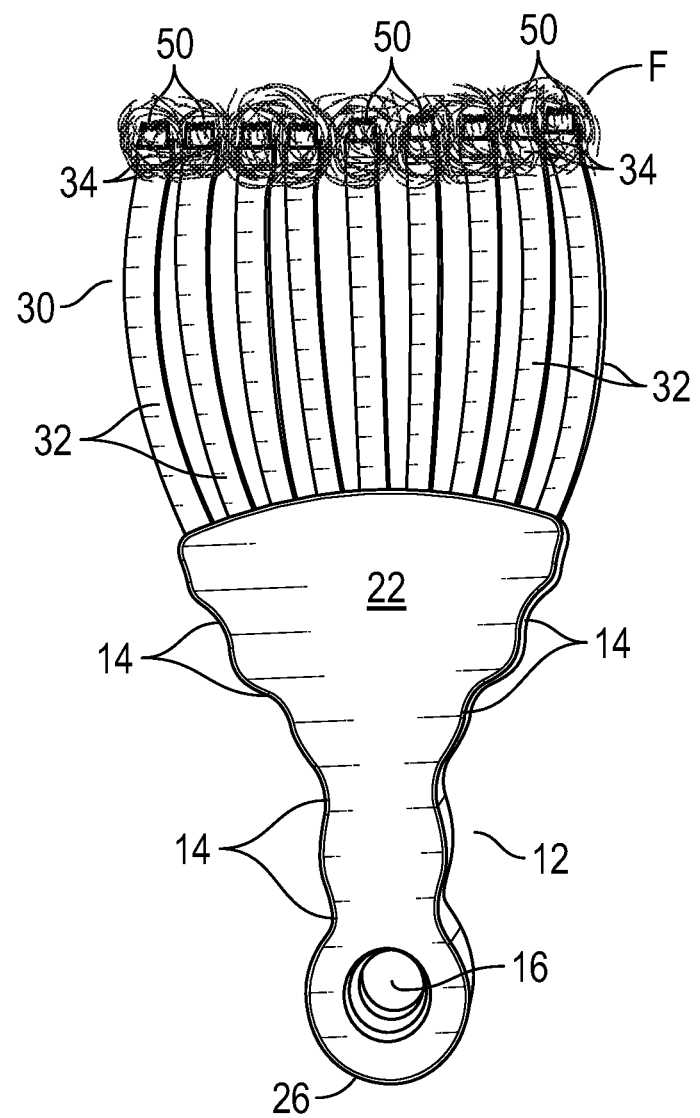
FIG. 28 is another illustration of FIG. 4 and further showing the grooming device that has captured hair or fur after grooming being conducted on an animal.

FIG. 28 is another illustration of FIG. 4 and further shows the grooming device that has captured hair or fur F after grooming being conducted on an animal. The use or action of the brush causes the fur to first collect the hair strands on various locations on the tines, then to clump the hair strands toward the distal ends of the tines where the hair strands will remain. One clear advantage of the grooming device of the invention is that it is capable of collecting the hair/fur near the distal ends of the device so that the other portions of the tines 30 do not become bound up with fur that might otherwise prevent the tines from independently flexing during use. Also, because of the arrangement of the tines and the bends 34, a user can easily clear the device from collected fur/hair by simply striking the handle 12 or tines 30 against a solid object. This striking or flicking motion causes the tines 30 to flex and then rebound or recoil which in turn causes the fur to be dislodged. Contrast this self-cleaning aspect of the invention to a traditional comb or brush in which the user must pick and pull strands of hair/fur from the tines. Particularly for animals with thick fur/hair, this self-cleaning feature enhances effective grooming and saves time.

Although it should be understood that the particular spacing of and dimensioning of the blades 50 and teeth 74 are not expressly limited herein, there are some spacing and dimensions that have been proven to be particularly effective with respect to grooming dogs. According to one preferred embodiment, there can be between about eighteen to twenty-four teeth per inch. According to another preferred embodiment, the height H of a blade 50 (see FIG. 26) can be approximately 0.80 of an inch. The width W of a blade can be between about 0.50 of an inch to 1 inch. According to another preferred embodiment in which there is a wavy pattern such as illustrated in FIG. 27, the teeth 74 can be arranged so that for a first group of teeth, there are about four to six teeth disposed on one lateral side of an axis extending along the width W while a next group of about four to six teeth are disposed on the opposite lateral side of the axis.

Figure 29:
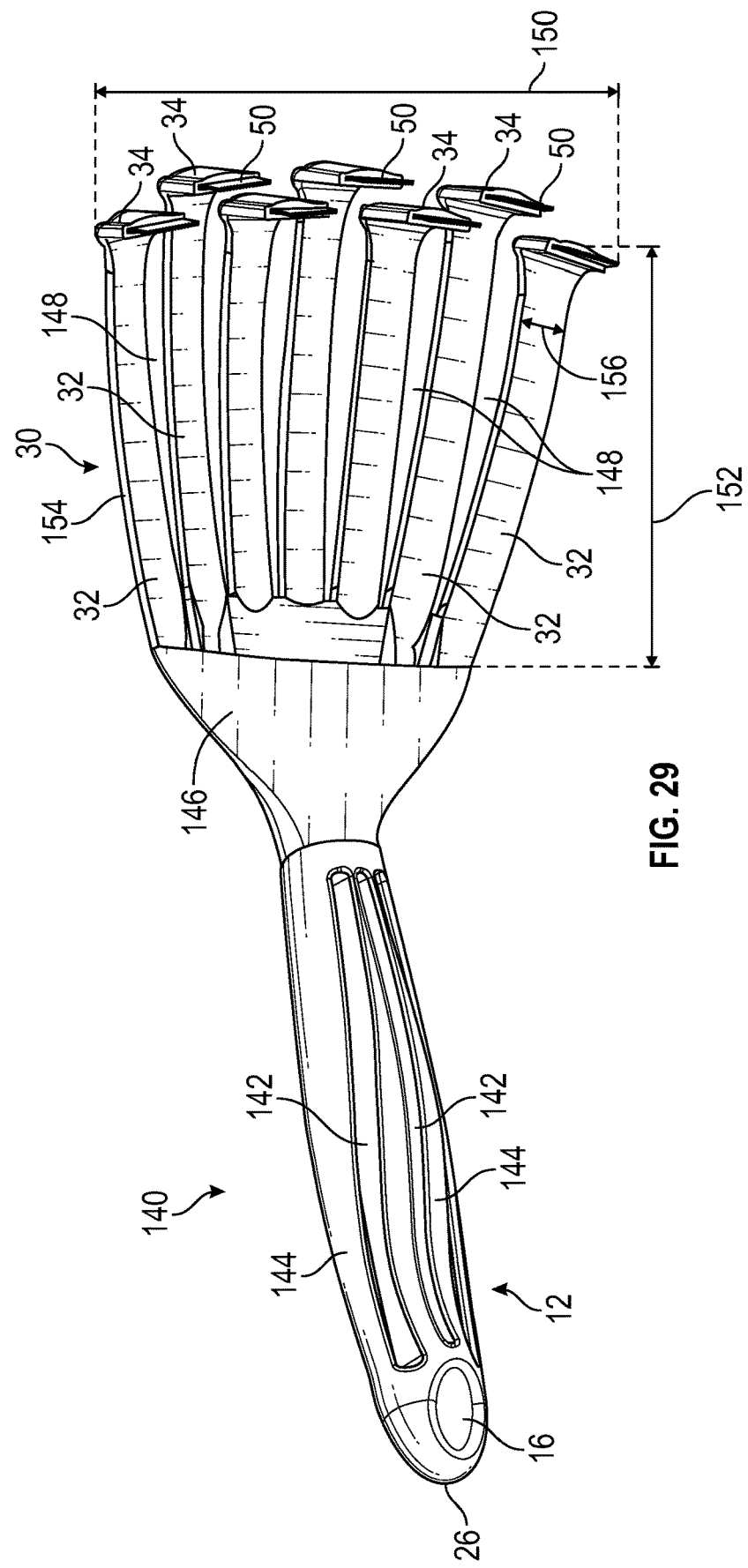
FIG. 29 is a bottom perspective view of another preferred embodiment of the grooming device of the invention.

Referring now to FIG. 29, a bottom perspective view of another preferred embodiment of the grooming device 140 of the invention is illustrated. The same reference numerals are used in some cases in this figure and subsequent figures to denote the same structural features shown in the prior embodiments, and with some new reference numerals being assigned to show different or additional structural details. Further, some reference numerals are added to show preferred dimensioning of the embodiment. The device 140 of FIG. 29 comprises the handle 12, the plurality of tines 30 and the corresponding plurality of grooming elements 50 secured to the distal ends of the tines. The grooming elements 50 can be removable such as disclosed with respect to the other embodiments. The handle 12 is shown as comprising a body 144 with a plurality of grooves or channels 142 formed in the body. The grooves or channels 142 may be formed completely through the body 144 thereby forming openings, or the grooves/channels can only be formed partially through the thickness of the body 144. Optionally, the through hole 16 may be formed in the gripping end 26 of the handle 12 so the device may be hung for storage. Between the handle 12 and the proximal ends of the tines 30 is an intermediate solid section 146 which can add a desired amount of stiffness to the device when in use, while the tines may provide the desired amount of flexing or displacement when the tines contact an animal during grooming. A certain amount of flexure or bending of the tines is desirable in grooming so that the tines may provide a variable force on the animal as grooming takes place. The solid section 146 provides some stability for positioning the device at a desired area, and the flexure in the tines at the same time allows the device to be responsive to moving the grooming elements 50 through the animal's fur which may not have a uniform thickness or density. Accordingly, the tines are able to individually flex and shift to react to the potentially non-uniform thickness or density of the fur.

Each tine 30 can be further defined as having the shaft or body 32. As with the other embodiments, the bodies 32 are shown as having a uniform shape including substantially equal thicknesses and widths. The lengths of the bodies 32 of the tines can be selected to provide variable contact of the grooming elements 50 with the animal. In FIG. 29, the tines are presented in a staggered arrangement in which three of the grooming elements 50 are spaced forward or distally from four other proximally arranged grooming elements 50. A total of seven tines and corresponding grooming elements are shown but it should be understood that a fewer or greater numbers of tines and grooming elements can be provided depending upon the particular animal being groomed or the particular area of the animal being groomed.

According to another aspect of the embodiment of FIG. 29, and according to any of the other disclosed embodiments herein, the tines can also be described as being presented in an array. The array may have a preferred overall width and length, and each of the tines may have preferred dimensions as well. The overall width of the array is shown in FIG. 29 as width 150, and such width 150 can preferably be between about 3.5 to 4.0 inches. An overall length of the tines is shown in FIG. 29 as length 152, and such length can be between about 2.0 to 4.0 inches. A preferred width of the tines is the width 156 as depicted in FIG. 29, and such width may be between about 0.20 to 0.40 inches. A preferred thickness of the tines is the thickness 154 as depicted in FIG. 29, and such thickness may be between about 0.040 to 0.070 inches. A preferred spacing or gap between the tines 30 is the gap or space 148 as depicted in FIG. 29, and such gap or space may be between about 0.25 to 0.50 inches.

Figure 30:
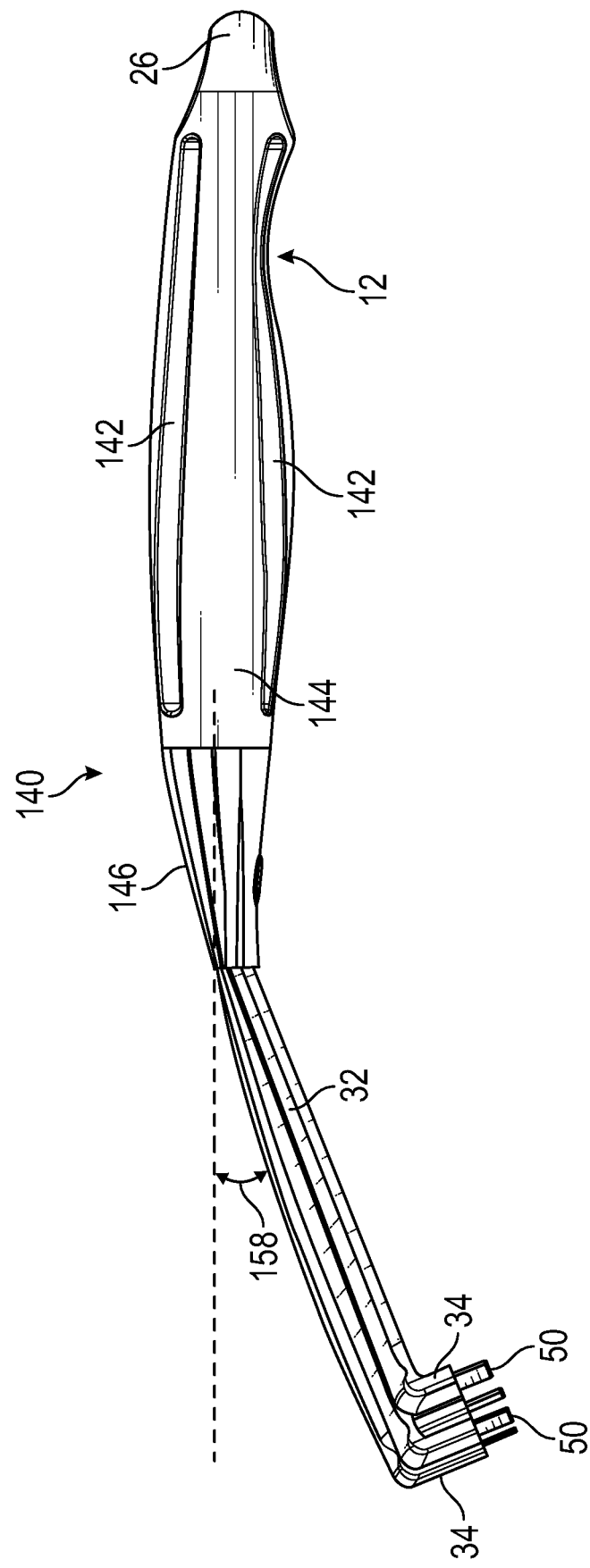
FIG. 30 is a side view of the embodiment of FIG. 29.

FIG. 30 is a side view of the embodiment of FIG. 29. Another feature of the invention may include an angular arrangement of the tines 32 as they extend away from the intermediate section 146 and handle 12. The handle 12 and intermediate section 146 are depicted as extending along a substantially planar axis denoted by the dotted line. The angle at which the tines 32 extend from this axis is shown as angle 158. The angle 158 can be between about 30-60° according to preferred range of this embodiment. As a user applies pressure to the tines in use, the tines will bend upwards according to the orientation of FIG. 30. A greater extension angle allows a user to apply more pressure to the device without the tines bending upwards beyond the axis, and in which case, allows the device to maintain separation from the animal so that the user's hand does not then interfere with the action of the tines. If there was no extension angle provided and the tines were easily bent during use, the user's hand would collapse against the animal and therefore not provide a good grooming action.

Figure 31:
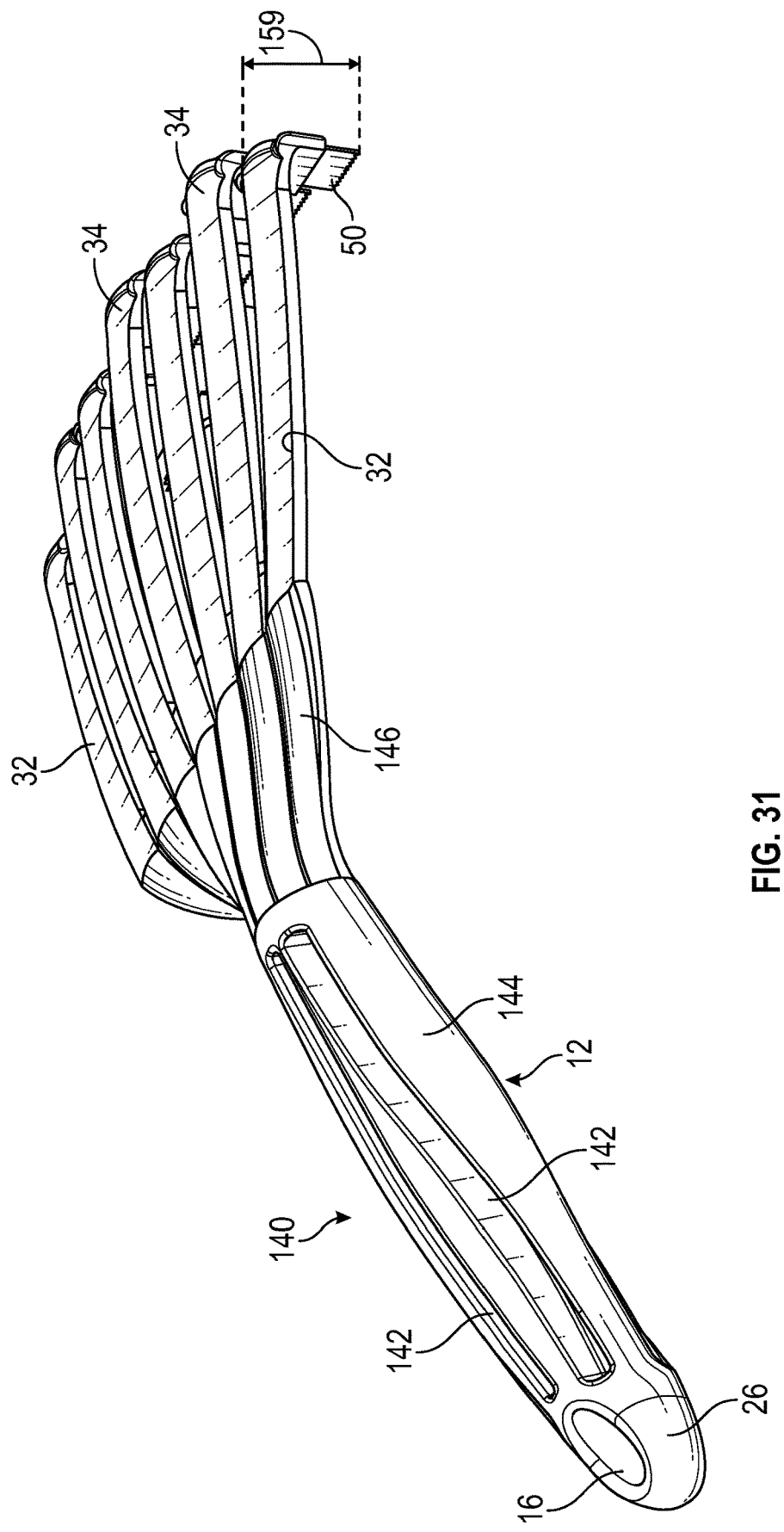
FIG. 31 is a side perspective view of the embodiment of FIG. 29.

Referring to FIG. 31, another dimension shown to have particular utility is the length of the bend in the distal ends of the tines, shown as bend length 159. One preferred dimension for the length of the bend 159 is between about 0.40 to 1.0 inch. For thick fur of an animal, another particular range is between about 0.60 to 0.80 of an inch. For an animal that may have thinner fur, another particular range is between about 0.40 to 0.60 of an inch.

The angle of the bend in the distal ends of the tines in relation to the body of the substantially flat or planar tine is shown as approximately 90°. It shall be understood that this bend angle can be modified and bend angles of between about 75° to 120° have been shown to produce good grooming results in removing animal hair/fur.

The above-described dimensions and angles have particular utility with respect to grooming domestic animals such as cats and dogs. Through extensive experimentation, these dimensions have been able to generate very efficient grooming actions in which the loose hair or fur of the animal being groomed can be effectively loosened and removed. A depiction of an animal's hair or fur being removed is depicted in FIG. 28 as mentioned.

Figure 32:
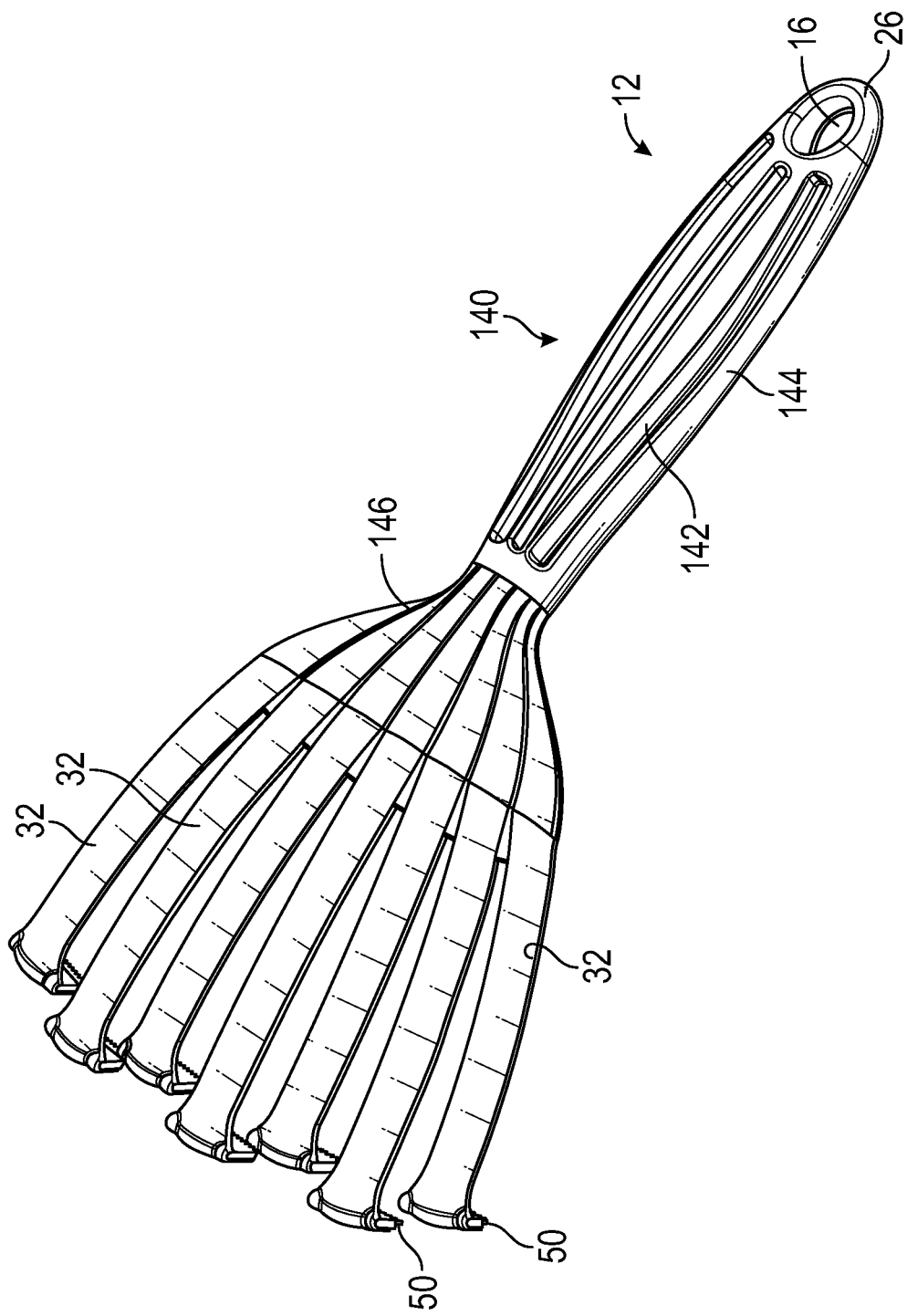
FIG. 32 is a top perspective view of the embodiment of FIG. 29.

FIG. 32 is a top perspective view of the embodiment of FIG. 29. This figure provides another view of the embodiment in which the staggered arrangement of the tine tips are shown and the tines are presented as an array or substantially uniform group of tines. With respect to the spacings or gaps 148 between the tines 30 as described in FIG. 29, FIG. 32 also shows that there is a slight narrowing of the gaps 148 as the gaps approach the intermediate section 146. Nonetheless, there is still a space or gap between the tines 30 at the junction or connection points where the tines attach to the intermediate section.

The above-described distances and angles should be considered an important feature of the embodiment of FIGS. 29-32, although this embodiment should not be interpreted as being strictly limited to these distances and angles. Other ranges were tested but did not result in as effective grooming.

Figure 33:
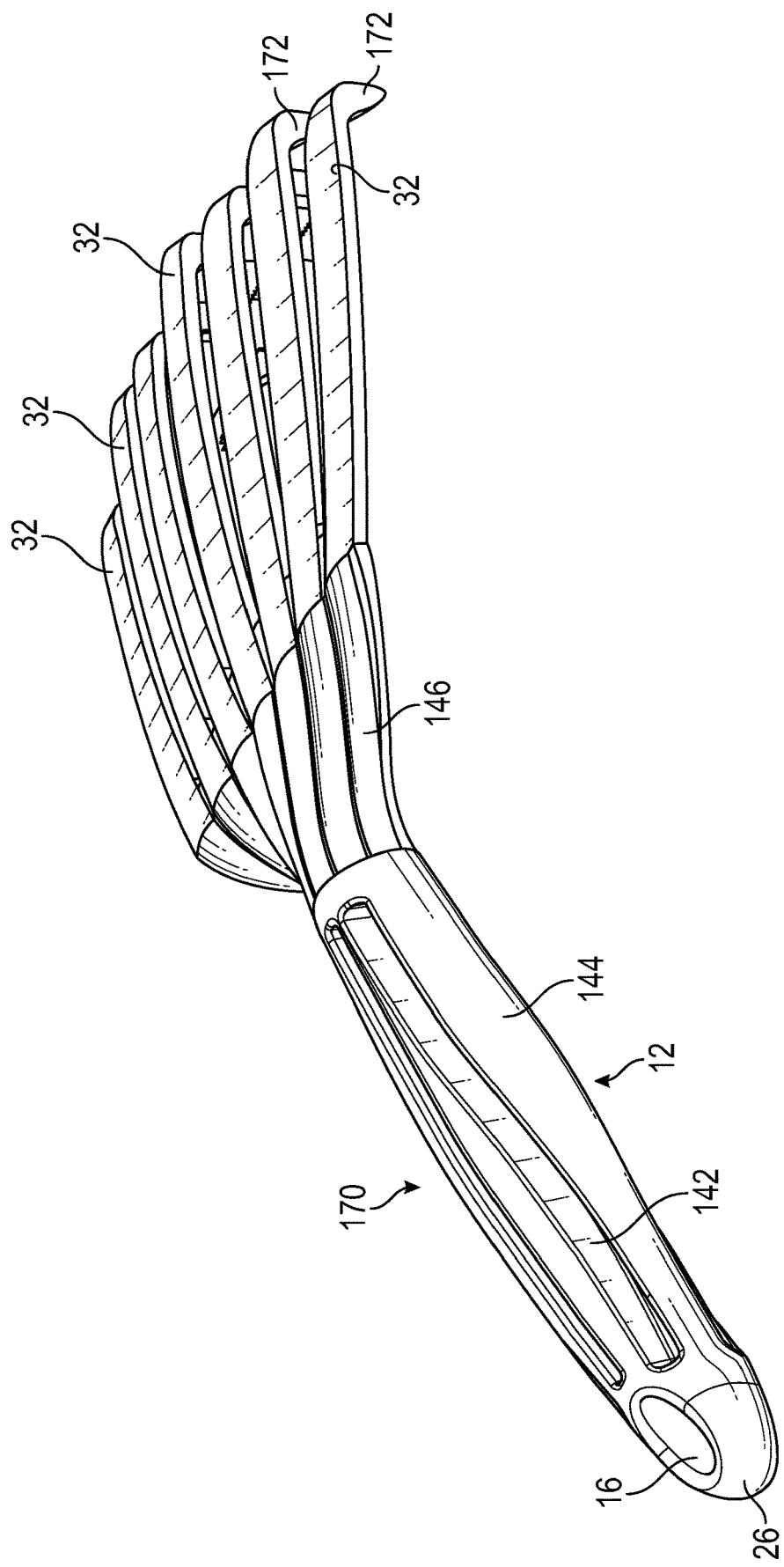
FIG. 33 is a side perspective view of another embodiment of grooming device of the invention.

FIG. 33 is a side perspective view of another embodiment of grooming device 170 of the invention. This embodiment of the device 170 differs in that the tips or ends of the tines have a different shape and the tips/ends are integrally formed with the bodies of the tines 32. For example, the tines shown in FIG. 33 can be uniform molded pieces with the tines and without separate or removable grooming elements 50. The tines have tips or ends 172 that are described in more detail with respect to FIG. 36.

Figure 34:
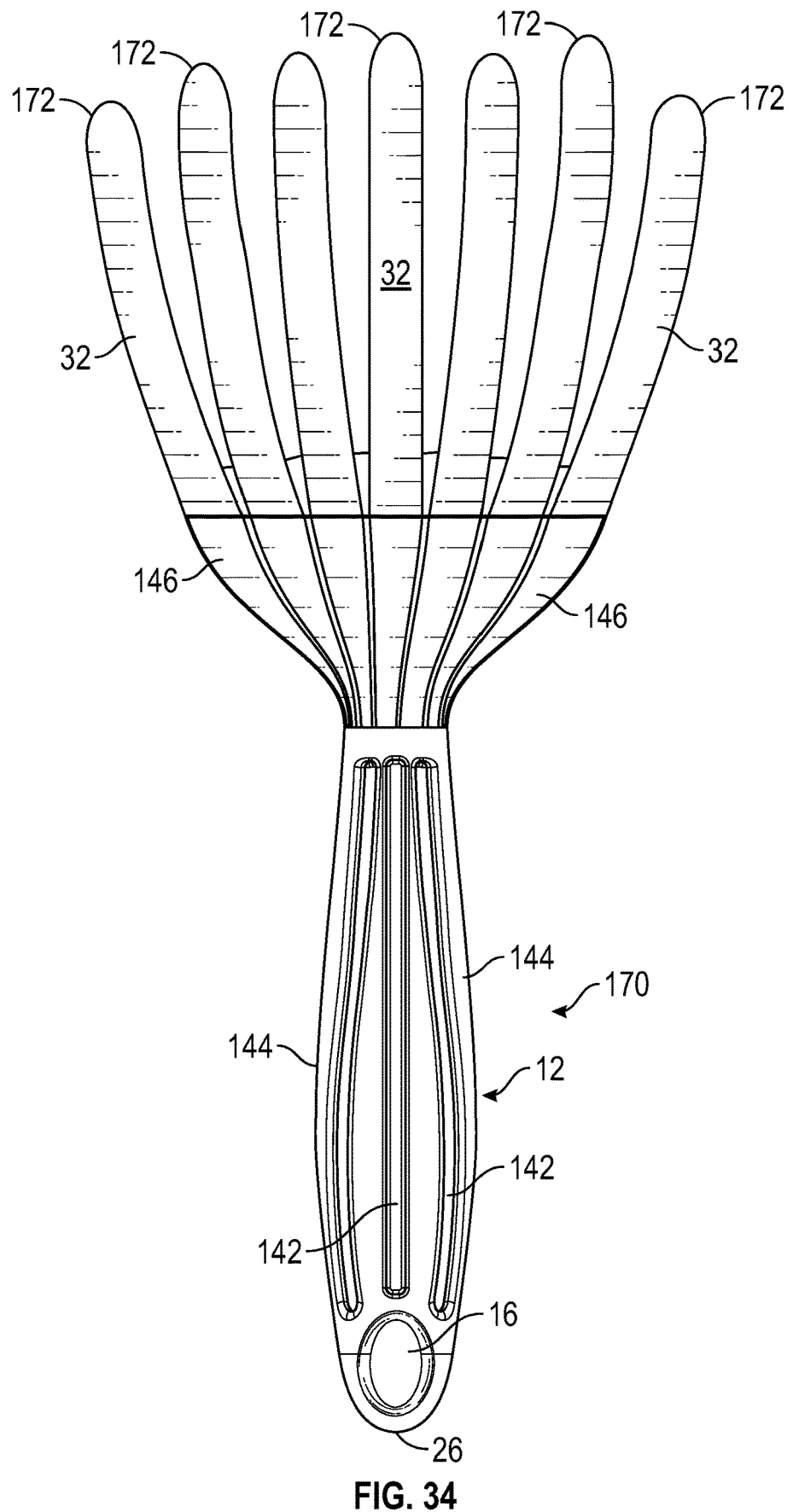
FIG. 34 is a top plan view of the embodiment of FIG. 33.

FIG. 34 is a top plan view of the embodiment of FIG. 33 which provides further details on the particular arrangement and spacing of the tines. The tips or ends of tines 172 in this embodiment are slightly staggered or offset, but the tips 172 are more linearly aligned as compared to the embodiment of FIGS. 29-32.

FIG. 35 is a bottom plan view of the embodiment of FIG. 33. A total of seven tines are illustrated, but as with the other embodiments, the number of tines can be changed to best match the type of grooming to be conducted on selected parts of the animal.

Figure 37:
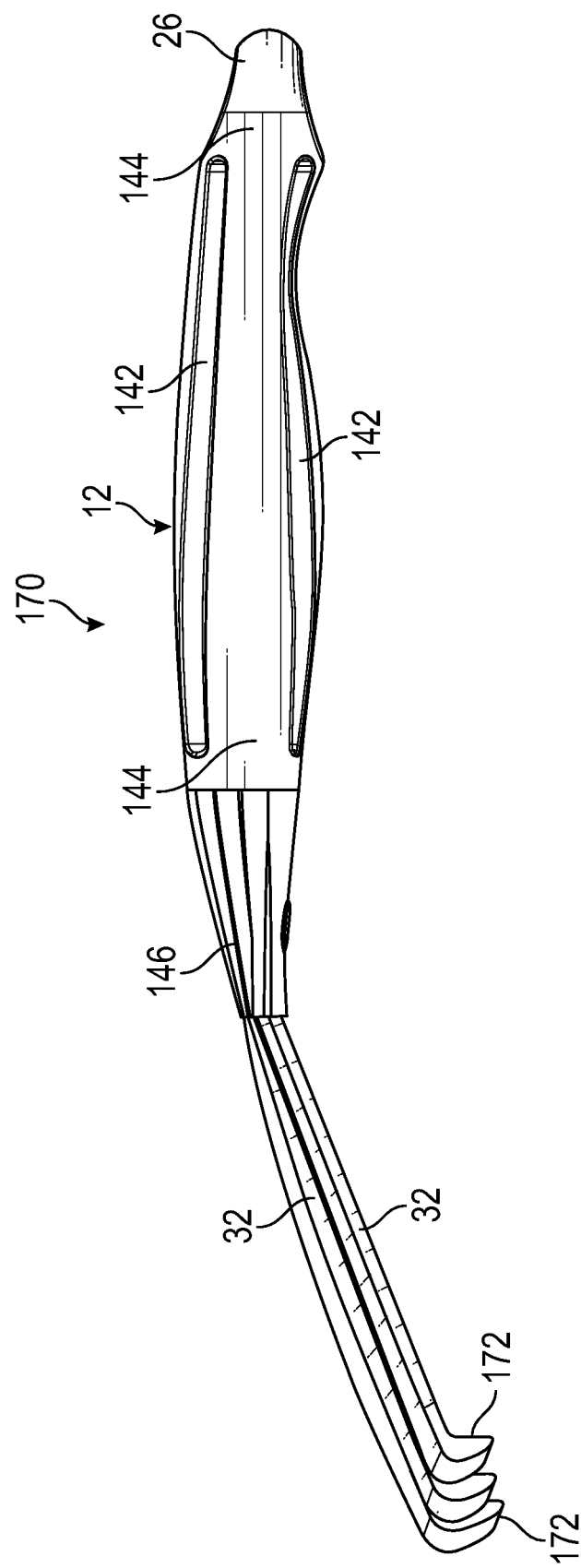
FIG. 37 is a side view of the embodiment of FIG. 33.

FIG. 36 is an enlarged perspective view of the tip 172 of a tine according to FIG. 35. The tip 172 can be described as having a top portion 176 that curves in an angular manner so that the top portion forms a bend that is substantially perpendicular to the direction of extension of the body 32 of the tine 30. This bend in the top portion 176 is similar to the bends in the tips described for the other embodiments. The top portion 176 terminates with a bottom curved portion 174. The side portion or area 178 of the tip 172 as viewed in FIG. 36 has a V-shape or U-shape 178 in which the curved portion 174 does not come to a point but rather has a curved surface. Another way to interpret the side view of the tip 172 is that it has a general triangular shape in which the first part of the top portion 176 adjacent the end of the body 32 is considered the first leg of a triangle and the converging opposite side edges of the area 178 forms the other two legs of the triangle. FIG. 37 is a side view of the embodiment of FIG. 33 and shows further details of the embodiment from this side view.

Figure 38:
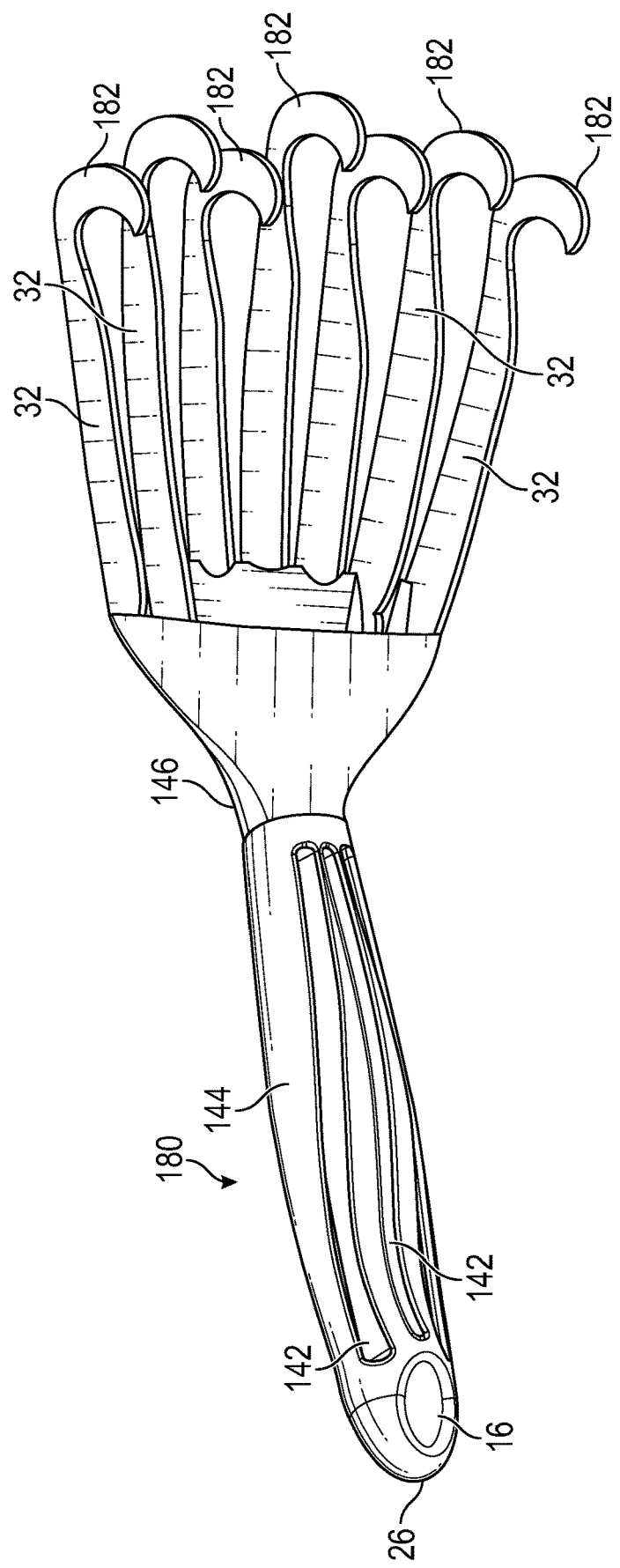
FIG. 38 is a bottom perspective view of another embodiment of the grooming device of the invention.
Figure 39:
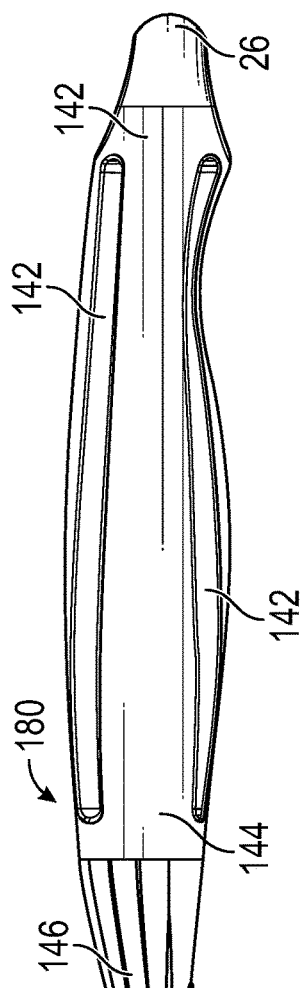
FIG. 39 is a side view of the embodiment of FIG. 38.
Figure 39:
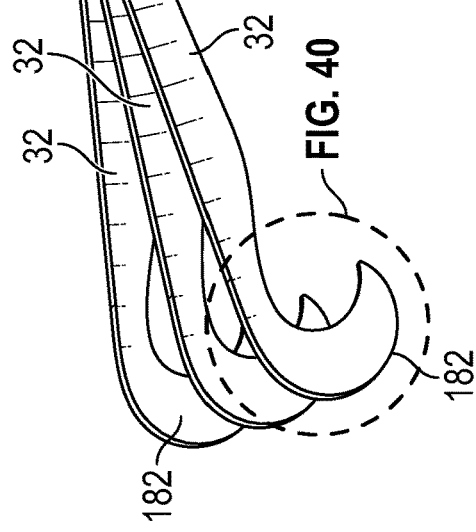

FIG. 38 is a bottom perspective view of another embodiment 180 of the grooming device of the invention. In this embodiment, the tips or ends 182 of the tines 30 have a hook or claw shape as discussed in further detail with respect to FIG. 40. The general arrangement of the tines 30 is similar to other embodiments in which there is a slight offset or stagger between the tips of the tines and the specific number of tines is shown as seven total. Again, the particular number of tines can be adjusted, as well as the spacing between the tines and the amount of offset or stagger between the tips of the tines. FIG. 39 is a side view of the embodiment of FIG. 38 showing that there is also a slight offset between the tines as measured from an elevation along the side view. In other words, for the three tines illustrated in FIG. 39, the closest tine is below the second closest tine and the furthest tine is above the second closest tine. The other four tines are not visible in the side view of FIG. 38 because of their alignment with the three visible tines. Therefore, this embodiment also discloses an elevation differential between the times as viewed from the side view of FIG. 38.

Figure 40:
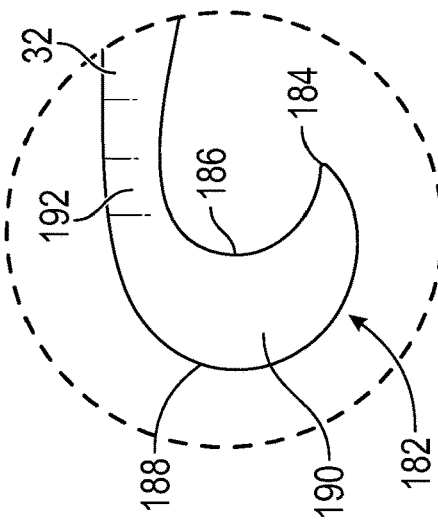
FIG. 40 is an enlarged side view of one of the tine tips shown in FIG. 39.

FIG. 40 is an enlarged side or elevation view of FIG. 39 of one of the tips 182 of grooming elements 30. The tip or end of the tine has a claw or hook shape. This claw or hook shape can be described as including a proximal portion 192 that connects to the body 32 of the tine and an outer edge 188 that is curved and traverses an arc that is at least 180° or greater. The distal end of the tip 182 terminates at a converging point 184. The inner edge 186 is curved and also traverses an arc of at least 180° or greater. The inner edge 186 may be sharpened to form a knife edge in which the inner edge is capable of more easily separating fur clumps or knots. If enough pressure is applied, the inner edge may actually work as a knife edge to cut through clumps or knots. The side of the tip 182 according to the view in FIG. 40 has a crescent shape. Another way to describe the tip 182 of the grooming element is that the grooming element terminates at a converging point and an inner surface of the grooming element has a sharpened edge One dimension that can be recited as being particularly useful in grooming animals such as dogs or cats is the distance 194 that measures the distance between the upper surface of the proximal portion 192 and the lowermost part of the outer edge 188. According to a preferred embodiment, this distance 194 could be between about 0.40 to 1.0 inch. For thick fur, the distance 194 could be in a range between about 0.60 to 0.80 of an inch. For thinner fur, the distance could be in a range of between about 0.40-0.60 of an inch. The distance 194 has been determined according to extensive testing with animals such as dogs and cats and this distance should be considered an important feature of this embodiment. Other ranges were tested but did not result in as effective grooming.

According to one mechanism of action for the different types of teeth incorporated in the illustrated grooming elements, pressure placed on the fur of the animal by the teeth causes separation of hair strands thereby removing knots or other irregularities in the fur. Another mechanism of action is a tension force placed on the hair strands thereby removing loose strands at the same type of the hair strands is separated. Another mechanism of action is the variable penetration of the grooming elements into the fur whereby upper and lower layers of fur are groomed simultaneously as a result of the independent operation of the grooming elements that are individually supported by separated or spaced tines.

One skilled in the art can clearly appreciate the enhanced functionality achieved by the grooming device of the invention. The tines provide variable pressure for grooming and can therefore be tailored for use with many different types of animal fur. The grooming elements can be selected for a specific grooming purpose and since the grooming elements are replaceable, a single device handle can be used for an extensive array of grooming tasks.

Although the description and figures herein disclose multiple preferred embodiments, it should be understood that the invention is not strictly limited to these embodiments. The scope of the invention must be considered as a whole considering the description, figures and claims appended hereto.

What is claimed is:

1. A grooming device comprising:
    a handle;
    a plurality of tines each having a proximal end secured to said handle and a distal end extending away from the handle;
    a bend incorporated at the distal end of each tine;
    the plurality of tines being spaced from one another laterally;

a removable grooming element attached to each tine, said removable grooming element having an exposed end with a plurality of teeth formed thereon;

wherein a first group of tines of said plurality of tines and corresponding removable grooming elements form a first row and a second group of tines of said plurality of tines and corresponding removable grooming elements form a second row that is longitudinally spaced from said first row; and wherein said plurality of tines are substantially planar with respect to one another.

2. The grooming device of claim 1, wherein:
the bend forms an angle of between about 60 to 90 degrees.

3. The grooming device of claim 1, wherein:
said plurality of tines are substantially uniformly spaced from one another.

4. The grooming device of claim 1, further including:
a mid-support extending laterally across and connected to said plurality of tines.

5. The grooming device of claim 1, wherein:
the plurality of tines are arranged in an array and an overall width of the array is between about 8.89 cm to 10.16 cm (3.5 to 4.0 inches).

6. The grooming device of claim 1, wherein:
an overall length of each tine is between about 5.08 cm to 10.16 cm (2.0 to 4.0 inches).

7. The grooming device of claim 1, wherein:
a width of each tine is between about 0.508 cm to 1.016 cm (0.20 to 0.40 inches).

8. The grooming device of claim 1, wherein:
a thickness of each tine is between about 0.1016 cm-0.1778 cm (0.040 to0.070 inches).

9. The grooming device of claim 1, wherein:
a gap or space between the tines each tine is between about 0.635 cm-1.27 cm (.25 to. 50 inches).

10. The grooming device of claim 1, wherein:
a length of the bend is between about 1.016 cm to 2.54 cm (0.40 to 1.0 inches inch).

11. The grooming device of claim 1, wherein:
a length of the bend is between about 1.52 cm to 2.03 cm (0.60 to0.80 inches of an inch).

12. The grooming device of claim 1, wherein:
a length of the bend is between about 1.01 cm to 1.52 cm (0.40 to 0.60 inches of an inch).

13. The grooming device of claim 1, wherein:
an angle of the bend in distal ends of each tine in relation to the body is approximately 90 degrees.

* * * * *

UNITED STATES PATENT AND TRADEMARK OFFICE
CERTIFICATE OF CORRECTION

| | | |
|---|---|---|
| PATENT NO. | : 12,402,600 B2 | Page 1 of 1 |
| APPLICATION NO. | : 18/349038 | |
| DATED | : September 2, 2025 | |
| INVENTOR(S) | : Joseph P. Markham | |

It is certified that error appears in the above-identified patent and that said Letters Patent is hereby corrected as shown below:

In the Claims

Column 16, Line 10, Claim 9; Line 13, Claim 10; Line 15, Claim 11; and Line 18, Claim 12 should be corrected as below:

9. The grooming device of claim 1, wherein: a gap or space between each tine is between about 0.635cm-1.27cm (.25 to .50 inches).

10. The grooming device of claim 1, wherein: a length of the bend is between about 1.016cm to 2.54cm (0.40 to 1.0 inches).

11. The grooming device of claim 1, wherein: a length of the bend is between about 1.52cm to 2.03cm (0.60 to to 0.80 inches).

12. The grooming device of claim 1, wherein: a length of the bend is between about 1.01 cm to 1.52cm (0.40 to 0.60 inches).

Signed and Sealed this
Thirtieth Day of December, 2025

John A. Squires
*Director of the United States Patent and Trademark Office*